US008168570B2

(12) United States Patent
Barron et al.

(10) Patent No.: US 8,168,570 B2
(45) Date of Patent: *May 1, 2012

(54) METHOD OF MANUFACTURE AND THE USE OF A FUNCTIONAL PROPPANT FOR DETERMINATION OF SUBTERRANEAN FRACTURE GEOMETRIES

(75) Inventors: Andrew R. Barron, Houston, TX (US); Robert D. Skala, Katy, TX (US); Christopher E. Coker, Houston, TX (US); Dilip K. Chatterjee, Rochester, NY (US); Yuming Xie, Sugar Land, TX (US)

(73) Assignee: Oxane Materials, Inc., Houston, TX (US)

(*) Notice: Subject to any disclaimer, the term of this patent is extended or adjusted under 35 U.S.C. 154(b) by 308 days.

This patent is subject to a terminal disclaimer.

(21) Appl. No.: 12/468,088

(22) Filed: May 19, 2009

(65) Prior Publication Data
US 2009/0288820 A1 Nov. 26, 2009

Related U.S. Application Data

(60) Provisional application No. 61/054,515, filed on May 20, 2008, provisional application No. 61/054,622, filed on May 20, 2008, provisional application No. 61/120,317, filed on Dec. 5, 2008.

(51) Int. Cl.
*C09K 8/60* (2006.01)
*B23B 19/00* (2006.01)
(52) U.S. Cl. ........ 507/269; 428/357; 428/403; 428/404; 507/270; 507/271; 507/907; 507/924
(58) Field of Classification Search .................. 507/269, 507/270, 271, 907, 924; 428/357, 403, 404
See application file for complete search history.

(56) References Cited

U.S. PATENT DOCUMENTS

| | | | |
|---|---|---|---|
| 2,955,088 A | 10/1960 | Beerbower et al. |
| 3,806,795 A | 4/1974 | Morey |
| 3,954,655 A | 5/1976 | Case et al. |
| 4,731,531 A | 3/1988 | Handke |
| 5,049,743 A | 9/1991 | Taylor, III et al. |
| 5,093,811 A | 3/1992 | Mellor et al. |
| 5,182,051 A | 1/1993 | Bandy et al. |
| 5,220,504 A | 6/1993 | Holzhausen et al. |
| 5,243,190 A | 9/1993 | Bandy et al. |
| 5,322,126 A | 6/1994 | Scott, III |
| 5,929,437 A | 7/1999 | Elliott et al. |
| 6,724,687 B1 | 4/2004 | Stephenson et al. |
| 6,978,211 B2 | 12/2005 | Soliman et al. |
| 6,978,832 B2 | 12/2005 | Gardner et al. |
| 6,985,816 B2 | 1/2006 | Sorrells et al. |
| 7,051,808 B1 | 5/2006 | Vinegar et al. |
| 7,073,581 B2 | 7/2006 | Nguyen et al. |
| 7,082,993 B2 | 8/2006 | Ayoub et al. |
| 7,134,492 B2 | 11/2006 | Willberg et al. |
| 7,316,272 B2 | 1/2008 | Hurst et al. |
| 7,319,330 B2 | 1/2008 | Amundsen |
| 7,322,415 B2 | 1/2008 | de St. Remey |
| 7,327,145 B2 | 2/2008 | Haugland |
| 7,391,675 B2 | 6/2008 | Drew |
| 7,398,680 B2 | 7/2008 | Glasbergen et al. |
| 7,424,911 B2 | 9/2008 | McCarthy et al. |
| 7,450,053 B2 | 11/2008 | Funk et al. |
| 7,451,812 B2 | 11/2008 | Cooper et al. |
| 7,459,209 B2 * | 12/2008 | Smith et al. ................... 428/403 |
| 7,460,436 B2 | 12/2008 | Segall et al. |
| 7,472,748 B2 | 1/2009 | Gdanski et al. |
| 7,491,444 B2 | 2/2009 | Smith et al. |
| 8,003,212 B2 * | 8/2011 | Smith et al. ................... 428/403 |
| 2003/0066645 A1 | 4/2003 | Armatage |
| 2003/0107735 A1 | 6/2003 | Bland et al. |
| 2003/0205376 A1 | 11/2003 | Ayoub et al. |
| 2004/0206494 A1 | 10/2004 | Stephenson et al. |
| 2005/0017723 A1 | 1/2005 | Entov et al. |
| 2005/0056418 A1 | 3/2005 | Nguyen |
| 2005/0060099 A1 | 3/2005 | Sorrells et al. |
| 2005/0263281 A1 | 12/2005 | Lovell et al. |
| 2005/0274510 A1 * | 12/2005 | Nguyen et al. ........... 166/250.12 |
| 2006/0015310 A1 | 1/2006 | Husen et al. |
| 2006/0023567 A1 | 2/2006 | Uhl et al. |

(Continued)

FOREIGN PATENT DOCUMENTS
WO  WO 2007/013883 A2  2/2007
(Continued)

OTHER PUBLICATIONS

Communication Relating to the Results of the Partial International Search issued in corresponding International Patent Application No. PCT/US2009/044425 dated Apr. 7, 2010 (2 pages).

(Continued)

*Primary Examiner* — Timothy J. Kugel
(74) *Attorney, Agent, or Firm* — Kilyk & Bowersox, P.L.L.C.

(57) ABSTRACT

Proppants having added functional properties are provided, as are methods that use the proppants to track and trace the characteristics of a fracture in a geologic formation. Information obtained by the methods can be used to design a fracturing job, to increase conductivity in the fracture, and to enhance oil and gas recovery from the geologic formation. The functionalized proppants can be detected by a variety of methods utilizing, for example, an airborne magnetometer survey, ground penetrating radar, a high resolution accelerometer, a geophone, nuclear magnetic resonance, ultrasound, impedance measurements, piezoelectric activity, radioactivity, and the like. Methods of mapping a subterranean formation are also provided and use the functionalized proppants to detect characteristics of the formation.

24 Claims, No Drawings

U.S. PATENT DOCUMENTS

| | | | |
|---|---|---|---|
| 2006/0052251 | A1 | 3/2006 | Anderson et al. |
| 2006/0062084 | A1 | 3/2006 | Drew |
| 2006/0081412 | A1 | 4/2006 | Wright et al. |
| 2006/0102345 | A1 | 5/2006 | McCarthy et al. |
| 2006/0131012 | A1 | 6/2006 | Blauch et al. |
| 2006/0219402 | A1 | 10/2006 | Lecampion |
| 2007/0034373 | A1 | 2/2007 | McDaniel et al. |
| 2007/0047867 | A1 | 3/2007 | Goldner |
| 2007/0083331 | A1 | 4/2007 | Craig |
| 2007/0202318 | A1 | 8/2007 | Smith et al. |
| 2007/0215345 | A1 | 9/2007 | Lafferty et al. |
| 2007/0234788 | A1 | 10/2007 | Glasbergen et al. |
| 2007/0235181 | A1 | 10/2007 | Lecampion et al. |
| 2007/0256830 | A1 | 11/2007 | Entov et al. |
| 2007/0259183 | A1 | 11/2007 | Knobloch |
| 2007/0272407 | A1 | 11/2007 | Lehman et al. |
| 2007/0280047 | A1 | 12/2007 | MacGregor et al. |
| 2007/0288211 | A1 | 12/2007 | MacGregor et al. |
| 2007/0294034 | A1 | 12/2007 | Bratton et al. |
| 2008/0002522 | A1 | 1/2008 | Berg |
| 2008/0004847 | A1 | 1/2008 | Bradford |
| 2008/0068928 | A1 | 3/2008 | Duncan et al. |
| 2008/0069301 | A1 | 3/2008 | Shampine et al. |
| 2008/0069307 | A1 | 3/2008 | Shampine et al. |
| 2008/0128126 | A1 | 6/2008 | Dagenais et al. |
| 2008/0135245 | A1 | 6/2008 | Smith et al. |
| 2008/0149329 | A1 | 6/2008 | Cooper et al. |
| 2008/0151691 | A1 | 6/2008 | Eisner et al. |
| 2008/0152080 | A1 | 6/2008 | Shampine et al. |
| 2008/0162099 | A1 | 7/2008 | Vega Velasquez |
| 2008/0164021 | A1 | 7/2008 | Dykstra |
| 2008/0210421 | A1 | 9/2008 | Wilson et al. |
| 2008/0259727 | A1 | 10/2008 | Drew |
| 2008/0264162 | A1 | 10/2008 | Glasbergen et al. |
| 2008/0264163 | A1 | 10/2008 | Glasbergen et al. |
| 2009/0006005 | A1 | 1/2009 | Segal et al. |
| 2009/0010104 | A1 | 1/2009 | Leaney |
| 2009/0032254 | A1* | 2/2009 | Smith et al. ............. 166/280.2 |
| 2009/0037112 | A1 | 2/2009 | Soliman et al. |
| 2009/0048783 | A1 | 2/2009 | Jechumtalova et al. |
| 2009/0179649 | A1 | 7/2009 | Schmidt et al. |

FOREIGN PATENT DOCUMENTS

| | | | |
|---|---|---|---|
| WO | WO 2007/019585 A2 | 2/2007 | |

OTHER PUBLICATIONS

Parekh et al., "Ternary monodispersed $Mn_{0.5}Zn_{0.5}Fe_2O_4$ ferrite nanoparticles: preparation and magnetic characterization," Nanotechnology, No. 17, 2006, pp. 5970-5975 (6 pages).

Keluskar et al., "High permeability of low loss Mn-Zn ferrite obtained by sintering nanoparticle Mn-Zn ferrite," Journal of Magnetism and Magnetic Materials, No. 305, 2006, pp. 296-303 (8 pages).

Notification of Transmittal of the International Search Report and the Written Opinion of the International Searching Authority, or the Declaration, International Search Report, and Written Opinion of the International Searching Authority dated Jul. 23, 2010 issued in corresponding International Patent Application No. PCT/US2009/044425 (20 pages).

* cited by examiner

METHOD OF MANUFACTURE AND THE USE OF A FUNCTIONAL PROPPANT FOR DETERMINATION OF SUBTERRANEAN FRACTURE GEOMETRIES

CROSS REFERENCE TO RELATED APPLICATIONS

This application claims the benefit under 35 U.S.C. §119 (e) of prior U.S. Provisional Patent Application Nos. 61/054,515, filed May 20, 2008; 61/054,622, filed May 20, 2008; and 61/120,317, filed Dec. 5, 2008, all of which are incorporated herein in their entireties by reference.

FIELD OF THE INVENTION

The present invention relates to proppants and methods used to determine the characteristics of a fracture in a geologic formation.

BACKGROUND OF THE INVENTION

Proppants or propping agents are widely used to maintain permeability in oil and gas wells. Proppants are materials that can be dispersed in a carrier liquid and pumped into oil or gas wells under pressure during a fracturing process. Proppants can "prop" open fractures in the rock formation surrounding the wellbore and thus preclude such fractures from closing. As a result, the amount of formation surface area exposed to the wellbore can be increased, enhancing recovery rates. Proppants can also add mechanical strength to the formation and thus help maintain flow rates over time.

Proppants can provide additional functionality to cover such uses as tracking or tracing the characteristics of the proppant pack. For example, Nguyen et al. (U.S. Patent Application Publication No. US 2005/0274510 A1) describes the use of a particular conductive polymer and/or conductive filler phase in a polymer coated proppant to determine formation parameters via an electric field-based remote sensing procedure. In another example, Ayoub et al. (U.S. Pat. No. 7,082,993 B2) describes the use of active or passive devices to characterize fracture parameters. These two methods do not take into account the extreme and often hostile environment down hole in a typical hydrocarbon well system, which would necessarily lead to degradation and/or failure of the tracking device deployed in such situations. For example, extreme temperatures and pressures can lead to the degradation of polymeric based systems and active electronic devices as proposed in Ayoub et al.

McCarthy et al. (U.S. Patent Application Publication No. US 2006/0102345 A1) describes a proppant tracking and fracture zone characterization material. This material is essentially an additional particle or filler that is added to a proppant pack to enable sensing of the proppant pack. As the particles are generally smaller than the proppant particles themselves, there exists the possibility of "plugging" interstitial sites in the proppant-filled formation, thus leading to degradation of overall permeability of the proppant pack.

The above approaches collectively exhibit a combination of the following characteristics: poor proppant transport inhibiting both well performance (flow rates) and fracture imaging; poor conductivity under load, particularly at typical reservoir depths (i.e. greater than 1,000 feet); poor longevity due to attack by temperature, corrosion, stress cycling, or absolute closure stress; and poor signal to noise ratios precluding surface assessment requiring costly investment in offset wells or down hole measurement devices. In some cases, this precludes effective imaging of propped fracture length, width, and height. In the worst case, only two of these three dimensions can be imaged. In addition, in the above approaches, the specific gravities of the proppant and that of the sensing element or particle are not able to be matched, thus it becomes impossible to obtain a homogeneous mix of proppant and sensing particles within the proppant pack when placed in the formation.

A need exists for proppants having additional functional properties beyond serving to prop open subterranean fractures. A need also exists for methods to accurately map a fracture in three dimensions using above ground detection systems.

SUMMARY OF THE INVENTION

The present invention relates to a proppant having functional features beyond serving to "prop" open fractures in a subterranean rock formation.

The present invention also relates to a "functional" proppant that can be used to track and/or trace the characteristics of the proppant pack, for example, that can trace characteristics such as fracture height, fracture width, fracture depth, and/or fracture trajectory (i.e., azimuth, inclination, declination, deviations in path, etc.).

The present invention also has the ability to tailor the specific gravity of the sensing particles to the proppant used to prop open the subterranean fracture, thus, a homogenous mixture of proppant and sensing particles can be achieved and a more accurate image of a propped volume can be obtained.

The present invention also provides a method that enables the ability to use multiple modes of signal generation from the functional proppant, for example, the functional proppant can exhibit a combination of hollow acoustic resonance, paramagnetism, and/or strain energy release, and the properties can be used to generate signals, generate hollow acoustic resonance, cause explosive detonation, and/or generate magnetic attributes, useful to form a detectable signal.

The present invention further relates to a functional proppant that can be heated in-situ while the proppant is packed into and resides in a fracture. The additional heat can be used, for example, to degrade proppant carrier fluids and to enhance recovery from the formation.

The present invention further relates to a "reactive" proppant that can liberate a chemical under the control of a specific signal. In one or more embodiments, reactive proppants can absorb and liberate compounds used to dissolve particulates and etch the rock in the fracture formation.

The present invention further relates to a proppant having a functional component encased by, or incorporated into, a ceramic matrix. The ceramic matrix can serve to protect the functional component from the adverse effects of the down hole environment.

The present invention further relates to methods for accurately assessing the geometry of a subterranean fracture. The fracture formation properties can be assessed in real-time during a hydraulic fracturing treatment. For instance, the method can utilize a proppant comprising metallic or oxide particulates of the d-block elements, of the Periodic Table of Elements, and detect the proppant using a remote sensing technique such as an airborne magnetometer survey or a ground penetrating radar. In one or more embodiments, the method can utilize a proppant comprising a piezoelectric component, which can be detected using, for example, a high resolution accelerometer or geophone.

The present invention further relates to a proppant comprising magnetic materials that can be detected by a magnetic probe. The magnetic material can comprise nanoparticles with designed magnetic moments, for example, ferrite materials. The magnetic proppant particles can be imaged by detecting magnetic perturbations caused by the magnetic nanoprobes. The detection can be facilitated by using a magnetic antenna, for example, by using the casing of the wellbore, in combination with a superconducting quantum interference device (for example, a SQUID magnetometer).

The present invention further relates to a proppant that encapsulates within its structure, or on its surface, carbon nanotube arrays that provide an electrical backplate such that the proppant can be detected by measuring an electrical field generated by the electrical backplate.

In yet other embodiments, the present invention further relates to methods of increasing the electrical conductivity of a fracture utilizing electrically conductive proppants as described herein.

It is to be understood that both the foregoing general description and the following detailed description are exemplary and explanatory only and are intended to provide a further explanation of the present invention, as claimed, without limiting the invention.

DETAILED DESCRIPTION OF THE INVENTION

The present invention, in part, relates to a proppant particle that comprises a matrix, such as a ceramic matrix, glass matrix, or ceramic-glass matrix, and at least one functional component. The functional component can be encased by, or incorporated into, the matrix. As an option, the functional component can be incorporated into or encased by a polymer or polymeric material, including but not limited to, a layer containing the polymer or polymeric material. The matrix can serve to protect the functional component by virtue of its excellent thermal and environmental properties, thus mitigating and/or minimizing any adverse effects of the down-hole environment and potential damage to the functional component. The matrix can afford protection and strength imparting properties to the proppant.

The functional component of the proppant can be distributed substantially throughout the matrix (i.e., a particulate composite). The functional component can be incorporated, for example, as a discreet phase in the matrix. The functional component can be incorporated in the proppant particle in particular zones or locations in or on the proppant, such as in one or more layers that are optionally substantially overcoated with a further layer, such as a ceramic layer(s) (i.e., a multi-layer composite type structure) or polymer layer or other layer(s). The functional component can be incorporated in the proppant particle, for example, as a solid solution, and/or an alloy with the matrix, in one or more layers and substantially overcoated with a layer of the matrix and/or polymer. The proppant particle can comprise a core of functional component substantially overcoated with the matrix. The functional component can serve as a template material, which is then overcoated with a shell, such as a ceramic shell and/or polymer shell. For purposes of the present invention, a functional component that is "substantially overcoated" refers to at least about 50 percent of the exposed surface area coated, preferably at least about 70 percent coated, and more preferably at least about 90 percent coated, or at least 99 percent coated with a material such as with the ceramic matrix and/or polymer. It is to be understood that while ceramic matrix is mentioned throughout, other matrix material can be used, for instance, glass-ceramic matrix, polymer, and other matrix materials, such as the materials described in the patents/patent applications mentioned herein. Alternatively, the functional material or phase may be formed in situ during heat treatment or sintering through the solid state reaction of constituent proppant compounds.

Methods of making various embodiments of proppant particles of the present invention (minus the functional component), and examples of various embodiments of proppant particles (minus the functional components), are described in U.S. patent application Ser. Nos. 11/347,664; 11/498,527; 11/728,953; and 11/769,247, which are incorporated in their entireties herein by reference. One or more types of the functional components described herein can be incorporated into these proppants as part of the core, as part of one or more layers, one or more coatings, as a separate core, as a separate layer, as a separate coating, or any combination thereof.

The functional component can comprise a magnetic, supermagnetic, and/or paramagnetic material. The magnetic, supermagnetic, and/or paramagnetic material can comprise a ceramic material having a ferrite structure, for example, $Fe_3O_4$ and doped homologs such as $Mn_xZn_{1-x}Fe_2O_4$, wherein x is any number between 0 and 1, with the proviso that x cannot equal 0 or 1. Other examples of ceramic materials suitable for this embodiment are described in Keluskar et al., "High Permeability of Low Loss Mn—Zn Ferrite Obtained by Sintering Nanoparticle Mn—Zn Ferrite," *Journal of Magnetism and Magnetic Materials,* 305, 296-303, (2006); and Parekh et al., "Ternary Monodispersed $Mn_{0.5}Zn_{0.5}Fe_2O_4$ Ferrite Nanoparticles: Preparation and Magnetic Characterization," *Nanotechnology,* 17, 5970-5975 (2006), the contents of both of which are incorporated herein in their entireties by reference.

Strong response for detection can be provided with single domain paramagnets. One method to accomplish this can comprise the inclusion of nanoparticles, for example, less than 100 nm in size, or from about 2 nm to about 20 nm. The nanoparticles can be incorporated into the matrix or added as a separate coating layer. The magnetic, supermagnetic, and/or paramagnetic material can be incorporated as a discreet phase in one or more layers that are substantially overcoated with a further ceramic layer (i.e., a multi-layer composite type structure) and/or polymer layer. The proppant particle can comprise a core of magnetic and/or paramagnetic material substantially overcoated with the ceramic matrix and/or polymer. The magnetic, supermagnetic, and/or paramagnetic material can also serve as a template material, which is then overcoated with a ceramic shell and/or polymer shell. While a ceramic layer and/or ceramic shell is mentioned, it is to be understood that any layer or shell can be used in any of the embodiments described throughout. Examples are set forth in the patents/patent applications described herein.

The functional component can comprise a paramagnetic material that is on the surface of the proppant particle. Such a material can have a high relaxivity to enable enhanced observation of proton nuclei via nuclear magnetic resonance (NMR). Paramagnetic compounds can increase the relaxation rates of the surrounding water proton spins. Relaxivity can be used, for example, to improve the contrast of the image, to study specific areas where the contrast agent better diffuses, and to perform functional magnetic resonance imaging (MRI). The relaxivity of MRI contrast agents can depend on the molecular structure and kinetics of the complex. Two possibilities to improve water relaxivity include, for example, increasing the number of water molecules that are in the inner sphere of the complex, and slowing down the molecular rotational correlation time. One typical relaxation agent is, for example, gadolinium (Gd), which is a lanthanide element that is paramagnetic in its trivalent state. The use of NMR can allow for enhanced imaging of the fractured features of the subterranean formation.

The functional component can comprise at least one d-block element from the Periodic Table of Elements. The functional component can comprise, for example, a metallic particulate, an oxide particulate, or any combination thereof, of a d-block element. The functional component can comprise, for example, at least one d-block element from Period 4 through Period 6 of the Periodic Table of Elements. The functional component can comprise, but is not limited to, for example, vanadium, chromium, manganese, iron, cobalt, nickel, zirconium, niobium, molybdenum, rhodium, palladium, yttrium, scandium, hafnium, tantalum, tungsten, platinum, or any combination thereof.

The proppant can comprise a template material comprising, for example, agglomerated pyrolytic carbon, conductive graphite, or a combination thereof. Sintering of the green proppant bodies can be carried out via rapid rate sintering, sintering in an inert or reducing atmosphere, sintering through the application of electromagnetic radiation (e.g. microwave sintering), sintering through the effect of inductive coupling between the proppant and an external electromagnetic field, or any combination of methods.

The proppant can be sintered at rapid rates. The rate of temperature rise can be such that the outer surfaces of the green ceramic sinter prior to the internal regions, thus a layer impermeable to gas migration is generated that prevents the thermally induced oxidation of the carbonaceous material within the proppant. Rates of heating for such rapid rate sintering can range, for example, from about 20° C./min to about 500° C./min, or from about 150° C./min to about 400° C./min. Other rates of heating such as ones above or below these ranges can be used.

The proppant can be sintered in an inert or reducing atmosphere. The presence of an inert or reducing atmosphere, such as nitrogen, helium, argon, hydrogen, methane, carbon monoxide, carbon dioxide, and the like can serve to suppress the thermal oxidation of the carbonaceous components of the proppant at elevated temperatures.

The proppant can be sintered via the application of an external electromagnetic (EM) field, as is the case, for example, in microwave sintering of ceramic materials. The ceramic material alone can be heated by the application of the electromagnetic field. Relatively low temperature rises of the carbonaceous material can be expected, mainly to occur through direct conduction of heat energy from the ceramic to the interior. The carbonaceous material can remain at a temperature lower than its spontaneous thermal oxidation temperature. The frequency can range, for example, from about 1 GHz to about 15 GHz, or from about 1.5 GHz to about 8 GHz.

The application of an EM field to the green proppant can result in the direct heating of a carbonaceous core of the proppant. This heating can be localized, and in the absence of a free flowing atmosphere, can result in the direct heating of the ceramic material from the interior portions to the outer portions of the proppant sphere. Consolidation of the green ceramic powder grains into a sintered impermeable mass at rapid rates can prevent thermally induced oxidation of the carbonaceous core. The electromagnetic field frequency can range from about 10 kHz to about 1 GHz.

The proppant particle can comprise a ceramic matrix and a functional component comprising a piezoelectric material. The piezoelectric material can be distributed substantially throughout the ceramic matrix or a polymer, or it can be incorporated in the proppant particle as a discreet phase in one or more layers substantially overcoated with the ceramic matrix and/or polymer. The proppant particle can comprise a core of piezoelectric material substantially overcoated with the ceramic matrix and/or polymer.

The piezoelectric material can comprise a ceramic material having a perovskite-type crystal structure. The piezoelectric material can comprise, for example, lead zirconium titanate, barium titanate, lead niobate, a channel-cut quartz single crystal, any doped titanate ceramic material having a perovskite-type crystal structure, or any combination thereof.

The proppant particle can further comprise an antenna-type device. Upon irradiation of the proppant particle with an electromagnetic field of a selected frequency, the antenna-type device can induce an electric current. The electric current can generate a contraction and/or an expansion of the piezoelectric material. Reversal of the electromagnetic field can result in a reversal of the electric current direction and thus a reversal in the contraction/expansion excitation effect of the piezoelectric material. The use of an alternating electromagnetic field (e.g., sinusoidal, triangular, square, pulse, etc.) can lead to rapid reversals in the contraction and expansion of the piezoelectric material. Accordingly, a vibration can be induced in the proppant particle, and in a proppant pack, due to this effect. The frequency of the vibrations of the proppant pack can be a function of the excitation frequency of the alternating electromagnetic field. The vibration frequency can be, for example, equal to the excitation frequency. In addition, a number of electromagnetic waveforms with differing frequencies, amplitudes, phase angles and/or waveform shapes can be superimposed on one another to form a complex waveform. Excitation of the piezoelectric by this complex waveform will yield a spectrum of responses from the piezoelectric phase and thus a spectrum of signals that can be detected by devices that may be located on the surface above the fracture, in the wellbore or in an offset well. This complex spectrum of signals can be deconvoluted through the use of any one of a number of mathematical transoformation techniques to obtain characteristic information from the proppant pack. The characteristic information gained from this analysis can include depth, trajectory, inclination, and/or declination and the like, essentially a 3 dimensional image of the proppant pack can be obtained.

The antenna-type device can be fabricated in-situ, for example, through the reduction of a metallic oxide particle to the corresponding metal (e.g. nickel oxide reduced to nickel, copper oxide reduced to copper, etc). A metallic oxide fiber can also be used as a precursor to the metallic antenna, this again being reduced to the corresponding metal during fabrication. The length of the antenna-type device can depend upon the wavelength of the electromagnetic field and typically can be any whole multiple of the electromagnetic wavelength. Fractional multiples of the electromagnetic wavelength are also permissible (e.g. $\frac{1}{4}$, $\frac{1}{2}$, $\frac{1}{8}$, $\frac{1}{16}$, etc).

One end of the antenna-type device can be electrically coupled to the piezoelectric phase in the proppant particle, with the antenna-type device located such that the antenna-type device radiates in a more or less outward direction. A plurality of antenna-type devices can also be employed in the structure, with each antenna-type device coupled to the piezoelectric phase and radiating in a more or less outward direction.

The antenna-type device can induce an electric current when irradiated with electromagnetic radiation of a selected frequency in a range of, for example, from about 50 Hz to about 1200 GHz, or from about 300 MHz to about 1200 GHz, or from about 300 GHz to about 600 GHz, or from about 500 GHz to 1000 GHz.

The proppant particle can comprise a ceramic matrix and a functional component comprising a cathodoluminescent material. The cathodoluminescent material can be distributed substantially throughout the ceramic matrix, or can be incorporated in the proppant particle as a discreet layer in at least one or more layers substantially overcoated with the ceramic matrix and/or other material such as a polymer layer. The proppant particle can also comprise a core of cathodoluminescent material substantially overcoated with the ceramic matrix and/or a polymer.

The cathodoluminescent material can emit light photons when the proppant particle is irradiated with an energy source, for example, irradiated with electromagnetic radiation. The excitation method of the cathodoluminescent material can be carried out, for example, by the generation of electrons in-situ. This can be achieved by the use of electromagnetic radiation to induce electron/hole pair formation in a phase of the proppant, as is the case, for example, in a variety of doped semi-conducting materials based on the silicon and germanium families. The cathodoluminescent material can comprise, for example, a phosphor, yttrium iron garnet, manganese doped magnesium aluminosilicate glass, or any combination thereof. The emitted photons can pass through the ceramic matrix provided the energy/frequency of the induced photon emission is such that the ceramic material is transparent to the induced photon energy.

The proppant particle can further comprise an antenna-type device. Upon irradiation of the proppant particle with electromagnetic radiation, the antenna-type device can induce a flow of electrons. The flow of electrons can excite the cathodoluminescent material to induce photon emission. The antenna-type device can comprise, for example, any of the antenna-type devices described above.

The frequency and/or energy of the photons can be dependent upon the characteristics of the cathodoluminescent material. The frequency and/or energy of the photons can be such that the surrounding formation and overburden are effectively transparent to the photons and provide a low impedance path to the progression of the photons from the subterranean locations to the surface locations.

The proppant particle can comprise a ceramic matrix and a functional component comprising carbon nanotubes, carbon nanoparticles, or a combination thereof. The carbon nanotubes and/or carbon nanoparticles can be distributed substantially throughout the ceramic matrix, and/or incorporated as a discreet phase in one or more layers substantially overcoated with the ceramic matrix and/or polymer. The proppant particle can comprise, for example, a silica core substantially coated with carbon nanotubes, and further substantially overcoated with the ceramic matrix and/or polymer. The proppant particle can also comprise, for example, a core of carbon nanotubes and/or carbon nanoparticles substantially overcoated with the ceramic matrix and/or polymer.

The carbon nanotubes can comprise, but are not limited to, for example, single wall nanotubes, multi-wall nanotubes, armchair nanotubes, zig-zag nanotubes, helical nanotubes, bundles of single wall nanotubes, bundles of multi-wall nanotubes, or any combination thereof. The carbon nanoparticles can comprise, but are not limited to, for example, spheres, layered spheres, platelets, grains, agglomerated spheres, plates, rods, single hexagonal planes, or any combination thereof.

Upon irradiation of the proppant particle with electromagnetic radiation, the functional component can absorb a portion of the electromagnetic radiation. The electromagnetic radiation can have a wavelength of, for example, from about 0.25 millimeter (mm) to about 1 meter (m), from about 1 mm to about 500 mm, or from about 10 mm to about 100 mm.

The proppant particle can comprise an antenna-type device comprising of an array of carbon nanotubes. The array of carbon nanotubes can provide a screen of electric fields. Furthermore, carbon nanotube arrays can be strong absorbers of microwave radiation. The proppant particle can be detected by the absorption of microwave radiation.

Glass-ceramic methods can be used to sinter a glassy material (e.g., having poor mechanical strength properties in its glassy phase) to near full density or full density (e.g., 90% or higher, 95% or higher, such as 90% to 100%, 95% to 99%) followed by crystallization or devitrification, to further enhance its mechanical and/or thermal material properties. A glass-ceramic composition further comprising amounts of iron oxides, for example, from about 1 percent to about 25 percent iron oxide by weight, can be highly resistant to corrosion and abrasion. In glass-ceramics, high amounts of iron can result in an immiscible phase of magnetite crystallizing out of the parent glass. This glass-ceramic methodology can be used to produce magnetite in a parent glass material. In one aspect of the present invention, one can take advantage of this glass-ceramic methodology by incorporating enough iron oxide into glass, for example, an aluminosilicate glass, such that during the normal processing and heating cycles necessary to sinter and crystallize the parent glass, an immiscible liquid is formed which then precipitates to a magnetite phase. Other metals or oxides thereof can be alternatively or additionally used, especially para-magnetic metals or oxides thereof. Examples include, but are not limited to, Fe, Ni, Co, Mn, Sm, Ce, Nd, Pr, or oxides thereof, or alloys thereof, or any combinations thereof.

A proppant particle can comprise a glass-ceramic matrix and a functional component comprising at least iron oxide. The functional component can be distributed throughout the glass-ceramic matrix and/or can be incorporated in the proppant particle as a discrete phase(s). The functional component can be incorporated in the proppant particle as a discrete phase(s) in at least one layer substantially (e.g., over 75% of the surface area coated) or fully overcoated with a layer of the glass-ceramic matrix. The glass-ceramic matrix can comprise, but is not limited to, for example, aluminosilicate glass, sodium-aluminosilicate glass, lithium-aluminosilicate, magnesium-aluminosilicate glass, borosilicate glass, fused silica glass, and the like, or any combinations thereof. Other examples include but are not limited to, calcium-aluminosilicate glass, barium-aluminosilicate glass, strontium-aluminosilicate glass, zirconium silicate glass, zirconium-aluminosilicate glass, MACOR glass, or any combinations thereof. The glass, for example, aluminosilicate glass, can comprise other alkali or alkaline components such as soda, potassia, magnesia, calcia, and/or other modifiers such as titania, zinc oxide, etc., or any combination thereof. Such modifiers can be included, for example, to control the crystallization of the parent glass.

The iron oxide can comprise, for example, magnetite, ferrous oxide, ferric oxide, and/or any combinations thereof. The iron oxide (and/or other metal or metal oxide) can be present in the proppant particle in an amount, for example, of from about 1 percent to about 40 percent or higher, about 10 percent to about 30 percent, about 12 percent to about 25 percent, or about 15 percent to about 20 percent by weight of the proppant particle. These ranges would also apply to other metals or oxides thereof that can be used in the present invention.

The proppant particle can comprise or further comprise a particulate material, for example, a particulate comprising an additional glass-ceramic material and/or a particulate phase of magnetite. The glass-ceramic matrix can bond to the particulate material to form a glassy composite, which can be sintered to a desired densification, and then subjected to additional heat treatment to crystallize the glassy phase. The choice of particulate material can be selected depending on the desired properties of the proppant particles. Magnetite may be the choice of particulate material, for example, in a composite where increased amounts of magnetite are desired above the amounts provided by the glass-ceramic content. If higher strength or other mechanical properties are desired then using, for example, other stronger aluminosilicate particulates with the glass-ceramic matrix may be used. The additional glass-ceramic particulate can be the same material as the glass-ceramic matrix, or it can be a different material. The amount of particulate material can be varied depending on the desired properties of the proppant particles. The glass-ceramic particulate material can be present in an amount of, for example, from about 5% to 95% by weight, such as from 15% to 80% by weight, or 20% to 60% by weight of the overall material. The particulate magnetite can be present in an amount of, for example, from about 1 percent to about 40 percent or higher, about 10 percent to about 30 percent, about 12 percent to about 25 percent, or about 15 percent to about 20 percent by weight of the proppant particle.

The proppant particle can generate heat. Upon irradiation of the proppant particle with electromagnetic radiation, the functional component can absorb a portion of the electromagnetic radiation and can generate heat. The proppant particle can perform in-situ heating while the proppant particle is packed into and resides in a fracture. The generated heat can be used, for example, to degrade carrier fluids that were used to transport the proppants, and/or reduce the viscosity of heavy crude oils in the formation.

Propped fracture width and height could be measured by determining thermal gradient anomalies near the wellbore using an array of thermocouples, thermometers, thermistors, platinum resistors, resistive thermal devices ("RTD's"), infra-red devices, and others.

Propped fracture length, width, and height could be detected from offset wellbores, bore holes, and the surface, for example, using infra-red thermal imaging devices. Such devices include charge coupled devices ("CCDs"), bolometers, and photonic detectors consisting of such devices as Indium gallium arsenide (InGaAs) photodiodes, Germanium photodiodes, Lead sulfide (PbS) photoconductive detectors, Lead selenide (PbSe) photoconductive detectors, Indium arsenide (InAs) photovoltaic detectors, Platinum silicide (PtSi) photovoltaic detectors, Indium antimonide (InSb) photoconductive detectors, Indium antimonide (InSb) photodiode detectors, Mercury cadmium telluride (MCT, HgCdTe) photoconductive detectors, Mercury zinc telluride (MZT, HgZnTe) photoconductive detectors, vanadium pentoxide microbolometers, superconducting infra-red detectors, and the like.

A proppant particle can comprise a matrix and a functional component comprising a reactive compound. The reactive compound can comprise, for example, an acid, a base, a compound that liberates energy (thermal, acoustic, and the like) such as an explosive, or any combination thereof. The reactive compound can be distributed substantially throughout the ceramic matrix, and/or incorporated in the proppant particle as a discreet phase or in one or more layers substantially overcoated with the ceramic matrix and/or polymer. The proppant particle can comprise a core of reactive compound substantially overcoated with ceramic matrix and/or polymer. The explosive can be a plastic or polymeric type explosive such as KNAUERIT, SEMTEX, PENO, PE4, Sprengkorper, C3, C4, PWM, NITROLIT, PW-5A, TVAREX 4A, PLASTITE, PBX, DEMEX, PP-01 or the like. The explosive may be comprised of substantially of the materials used for celebratory fireworks such as black powder, smokeless powder and the like.

The reactive phase can be a substance that enhances the breakdown and degradation of carrier fluids. This reactive phase can be mixed with the explosive material, or alternatively it can be a separate layer of the same particle. Upon detonation of the explosive charge contained within the proppant particle, the reactive phase can be dispersed through the fluid thus enhancing the breakdown or degradation of the carrier fluid.

The proppant particle can be a material that displays high strength when subjected to an isostatic or hydrostatic load or force, but may fail catastrophically when subjected to a uniaxial load or force. The proppant particle, when loaded uniaxially, can be made to deform elastically and the strain energy within the proppant particle will increase until the critical strain energy for the particle is attained. Upon reaching the critical strain energy value, the particle will fail catastrophically and the release of the strain energy will yield a brief pulse of energy, that manifests itself as an acoustic or sonic pulse. This sonic pulse may be detected by the methods described previously.

The reactivity of the functional component of the proppant particle can be liberated immediately upon reduction of the fracturing pressure and hence closure of the fracture walls on the proppant pack. Alternatively, the proppant particle can be coated with a substance that allows for a delay in the liberation of the reactive or functional component of the proppant for a period of time to allow dissipation of the "earth noises" associated with the closure of the fracture. This time period may range from 12 to 96 hours or longer. Likewise, the timed delay of the catastrophic failure of the proppant particles can be delayed by other methods.

The reactive compound can be released from the proppant particle upon subjecting the proppant particle to a signal. The signal can comprise, for example, a sonic signal, a microwave, or other electromagnetic radiation. The proppant particle can absorb the reactive compound, store the reactive compound such that the reactive compound is not substantially liberated, and then release the reactive compound when subjected to the signal. The reactive compound can comprise, for example, an acid that can etch rock in a subterranean fracture. The etched rock can provide enhanced conductivity. The sonic signal can be generated with a tranducer driven by an oscillator at its resonance point, a high energy impulse to generate a longditudinal wavefront such as generated by an air gun, a Vibroseis Unit, and/or a small explosive charge to generate wave packets with high specific energy.

A method for determining the geometry of a fracture in a geologic formation, or the placement of the proppant within the fractured formation, or the migration of the proppant pack within the fractured formation over time, can comprise injecting (or otherwise introducing) a proppant into the fracture, wherein the proppant comprises one or more types of a functional component(s). The proppant in the fracture can be tracked or traced, thus allowing the characteristics of the fracture (i.e., height, width, depth, and/or trajectory) to be determined. The method can further comprise injecting a fracturing fluid into a well at a pressure high enough to allow the fracturing fluid to initiate or extend a fracture in a geologic formation with which the well communicates, and to flow from the well into the fracture. The fracturing fluid can comprise a proppant particle comprising a ceramic matrix and a functional component. The ceramic matrix can serve to protect the functional component by virtue of its excellent thermal and environmental properties, thus mitigating and/or minimizing any adverse effects of the down hole environment.

Detection methodologies for detecting the proppant pack, and for determining the fracture characteristics, can include, for example, remote sensing techniques such as airborne magnetometer surveys, magnetic anomaly surveys, earth-resistivity surveys, ground penetrating radar surveys, nuclear magnetic resonance imaging, and the like. Other methodologies can also be utilized as described herein. The methods can determine the geometry of the proppant pack both spatially and time-resolved; thus, real-time measurements of the proppant pack growth can be possible. Instruments such as tilt meters, dip meters, accelerometers, geophones, magnetometers, SQUIDs, resonance microphones, pulsed neutron sources, radioactive tracers, gamma ray detectors, earth resistivity electrode assemblies, pulsed neutron decay ratemeters, gravitymeters, and the like may be used to detect and characterize the formation fractures and proppant pack locations. These tools may be placed on the surface above the fracture zone, within the wellbore at selected depths and/or in offset well adjacent to the original wellbore. The data may be collected after the offset well is completed, or alternatively the data may be collected during the drilling of the offset well by incorporating the detection instrumentation in the tool string.

Neutron activated emissions can be used to determine a fracture geometry. Irradiation of a material with a neutron source can be used to cause certain elements within the material to transmute to a radioisotope. Upon decay, these radioisotopes emit a characteristic radiation in the form of, for example, alpha radiation, beta radiation, and/or gamma radiation, or a combination thereof. The radiation can be detected via any one of a number of detector configurations or systems. Gamma radiation can be detected due to its relatively high energy and depth of penetration through most materials. By carefully choosing a tagging element to be included in a proppant, the production of induced gamma radiation can be optimized. For example, cobalt ($^{59}$Co) can be incorporated into a proppant structure and/or into a proppant coating. Upon irradiation with a neutron source, the $^{59}$Co can be made to absorb an incident neutron and transmute to the metastable isotope $^{60m}$Co. This form of cobalt, $^{60m}$Co, decays to $^{60}$Co with the spontaneous emission of a gamma ray. The $^{60}$Co isotope decays via the emission of a beta particle to metastable $^{60m}$Ni. The $^{60m}$Ni isotope undergoes spontaneous emission of a gamma ray to form the stable $^{60}$Ni isotope. The decay of $^{60m}$Co to $^{60}$Ni occurs with the emission of two gamma rays and a beta particle and exhibits a half life of 5.27 years. Detection of any or all of these radiation types and events can be used to determine fracture geometry.

Neutron activation sources that can be used can include reactors, fusors (e.g., a Farnsworth-Hirsch fusor), a radioisotope source that emits neutrons (e.g., an actinoid such as Californium), an alpha particle source (e.g. radium or americium) mixed with Beryllium to generate neutrons via the $^{12}$C+n reaction, or a D-T fusion reaction in a gas discharge tube. Detectors for the emitted gamma ray photons can include gas ionization detectors (e.g., a Geiger-Muller tube), scintillation detectors (e.g., a sodium iodide crystal), or semiconductor detectors (e.g., SiLi or GeLi).

A fracture geometry can be determined by using a fluid containing a neutron-activated radioisotope. A fluid "tagged" with an element that can be activated by neutron capture, for example, can be used. In an exemplary embodiment, a soluble $^{59}$Co salt can be added to proppant fluid and activated prior to pumping down a wellbore. Upon flowback of the fluid from the fracture zone, the radioactivity of the fluid can be measured and the activity determined. For instance, in consideration of a known flowback rate of the wellbore, the volume of fluid calculated and hence the dimensions of the fracture can be determined. In addition to the use of $^{59}$Co, one or more of the constituents of the fracturing fluid can be activated using incident neutrons. For example, $^{39}$K, the stable isotope of Potassium, can be transformed to $^{40}$K through the absorption of an incident neutron. The isotope $^{40}$K decays to $^{40}$Ca with the emission of a beta particle and that emission can be detected by any one of a number of detector types, for example, detector types as described herein.

The geophones may include an assembly of a single sensing element, or they may contain multiple sensing elements. In the case of multiple sensing elements, three or more elements are arranged in orthogonal directions. The arrangement of the sensing elements in the three orthogonal directions allows the geophone to detect both the compressive seismic waves and the shear seismic waves. The direction of wave propagation may also be determined. Additional sensing elements may be added to the geophone in this case the additional sensing elements are arranged in directions that are 45 degrees to the orthogonal axes. Other angles are possible. The data generated by the additional sensors allows the calculation of the orthogonal source vectors associated with the signal source.

Gravity field pertubations can be used to determine a fracture geometry. A surface mounted array of accelerometers can be distributed in the immediate area surrounding a well bore. Initial readings of the gravitational field can be collected from the individual accelerometer sensors to generate a gravitational map of the region of interest. Real time data collection of the gravitational field strength from each of the sensors can be conducted during fracturing and proppant placement operations. From differences in the initial and final accelerometer readings, pertubations in the gravitational field can be calculated and thus information about the fracture length, fracture trajectory azimuth and inclination, and propped dimensions of the proppant pack, can be deduced.

A method for determining the geometry of a fracture in a geologic formation can comprise injecting a proppant into the fracture wherein the proppant comprises magnetic and/or paramagnetic materials. The use of low frequency or direct current (DC) magnetic fields to detect the proppant can be accomplished with the use of the well casing as an 'antenna'. The proppant zone can have significant magnetic permeability and channel magnetic flux, and modify far-field magnetic field shape and magnitude of the magnetic field around the wellbore. The magnetic field can be scanned with a SQUID magnetometer or other devices can be used to sense perturbations of the magnetic field by the magnetic proppants. A comparison of the initial field strength and the final field strength can be used to determine the position of the proppants. For lateral boreholes, one can use an open hole or non-magnetic casing.

A method for determining the geometry of a fracture in a geologic formation can comprise injecting a proppant into the fracture wherein the proppant comprises a d-block element from the Periodic Table of Elements. The d-block element can be, for example, encased by, or incorporated into, a ceramic matrix or other matrix.

The method can further comprise providing a detector in a position to measure a magnetic field generated from the geologic formation, measuring the magnetic field generated from the geologic formation, and determining the geometry of the fracture from the measured magnetic field. The detector can comprise, for example, a magnetometer, an airborne magnetometer, or a superconducting quantum interference device (SQUID).

The method can comprise providing one or more electrodes in a position to measure the electrical resistance of the geologic formation, measuring the electrical resistance of the geologic formation, and determining the geometry of the fracture from the measured electrical resistance.

Electrical resistivity of subsurface materials is measured by causing an electrical current to flow in the earth between one pair of electrodes while the voltage across a second pair of electrodes is measured. The result is an "apparent" resistivity which is a value representing the weighted average resistivity over a volume of the earth. Variations in this measurement are caused by variations in the soil, rock, and pore fluid electrical resistivity. Surveys require contact with the ground, so they can be labor intensive. Results are sometimes interpreted directly, but more commonly, 1D, 2D or 3D models are estimated using inversion procedures. When the survey is conducted in order to obtain a 1D model, it is called a sounding. Profiles are used to build 2D models of the earth. Multiple lines, or more complex electrode arrangements are used to obtain 3D interpretations. The electrodes used for this work are simple metallic conductors that are driven into the earth at selected locations and with selected spacings, to a predetermined depth. Induced polarization (or IP) is a secondary measurement that can be made at the same time as DC resistivity if the correct equipment is included. IP measurements respond to variations in the capacity for subsurface materials to retain electric charge. This physical property is referred to as chargeability. Changes in chargeability can be detected when groundwater or subsurface fluids contain salts, hydrocarbons, or other materials, such a proppants.

The method can comprise providing a ground penetrating radar detector in a position to radiate electromagnetic signals into the geologic formation and to detect electromagnetic signals reflected from the geologic formation, radiating electromagnetic signals into the geologic formation, measuring the reflected electromagnetic signals, and determining the geometry of the fracture from the reflected electromagnetic signals.

The method can further comprise injecting a fracturing fluid into a well at a pressure high enough to allow the fracturing fluid to initiate or extend a fracture in a geologic formation with which the well communicates, and to flow from the well into the fracture. The fracturing fluid can comprise a proppant particle comprising a ceramic matrix and a d-block element(s) of the Periodic Table of Elements.

A method for determining the geometry of the fracture in a geologic formation can comprise injecting a proppant into the fracture wherein the proppant comprises a piezoelectric material and an antenna-type device. The geologic formation can be irradiated with an electromagnetic field sufficient to generate an electric current in the antenna-type device. The electric current can then excite the piezoelectric material to generate either a contraction or expansion effect of the piezoelectric material. Reversal of the electromagnetic field can result in a reversal in the direction of the electric current and thus a reversal in the contraction/expansion effect. An alternating electromagnetic field can provide rapid reversals in the contraction/expansion of the piezoelectric material, thus inducing a vibration in the proppant and/or proppant pack. The geologic formation can be irradiated with an alternating electromagnetic field sufficient to induce a vibration of the piezoelectric material. A detector can be provided in a position to measure vibrations in the geologic formation. The detector can measure the frequency of the vibrations and determine the geometry of the fracture from the measured vibrations. The detector can comprise, for example, an accelerometer, or a geophone. The alternating electromagnetic radiation can have a frequency that is, for example, sinusoidal, triangular, square, pulse, or any combination thereof. Accordingly, the vibration of the piezoelectric material can have a vibration frequency that is a function of the alternating electromagnetic radiation frequency. The vibration frequency can be, for example, equal to the electromagnetic radiation frequency.

Piezoelectric crystals can be provided with, for example, coated with, two or more electrodes, and then mixed with electrically conductive proppants. The electrically conductive proppants can include, for example, metal proppants, metal coated proppants, conductive-polymer-coated proppants, conductive metal oxide proppants, and the like, and combinations thereof. The concentration of piezoelectric crystals can be in a range of from 0.001% to 99% by volume, for example, in the range of from 0.01% by volume to 10% by volume, or from 0.1% by volume to 5% by volume, based on the total volume of the piezoelectric crystal and electrically conductive proppant mixture. The mixture can be pumped into a fracture, under pressure. As the mixture is injected into the fracture, and pressure within the fracture increases, the piezoelectric crystals are squeezed and generate electric potential which can be measured through the electrically conductive proppants. Measurement of the electrical potential can be made by measuring current through the mixture or by measuring the potential. Using signal processing, the location of the piezoelectric crystals, and thus the mixture, can be determined. Moreover, the amount of pressure exerted on the piezoelectric crystals in the mixture can also be measured.

Piezoelectricity can be used to determine fracture geometry and can be measured by measuring the vibrational amplitude of a material, using Atomic Force Microscopy (AFM). Impedance measurements as described above and exemplified in *IEEE Standard on Piezoelectricity ANSI/IEEE Std 176-1987* (New York: The Institute of Electrical and Electronics Engineers, 1987), which is incorporated herein in its entirety by reference, are the most popular way for investigation of piezoelectric properties of crystals. The AC voltage generated by a vibrating crystal can be made to achieve its maximum if a frequency of an exciting signal that is applied to the material is equal to a resonance frequency of the material.

As described herein, the electrode design for piezoelectric measurements utilizing impedance measurements and impedance spectroscopy concepts, can be dependent on subterranean fracture features. Electrodes implemented through the wellbore or through various locations across the predicted fracture geometry can be used to achieve such measurements.

The method can further comprise measuring the time of flight of the induced vibrations. Such measurements can be used, for example, to determine the depth of the fracture.

The method can further comprise injecting a fracturing fluid into a well at a pressure high enough to allow the fracturing fluid to initiate or extend a fracture in a geologic formation with which the well communicates and to flow from the well into the fracture wherein the fracturing fluid comprises a proppant particle comprising a ceramic matrix, an antenna-type device, and a piezoelectric material.

A functional aspect of the proppant can be due to photoluminescent effects caused by the emission of photons from a cathodoluminescent material. A method for determining the geometry of a fracture in a geologic formation can comprise providing a detector in a position to measure photons emitted from the geologic formation, injecting a proppant into the fracture, wherein the proppant comprises a cathodoluminescent material, irradiating the proppant with an energy source sufficient to induce the cathodoluminescent material to emit photons, measuring the photons emitted from the geologic formation, and determining the geometry of the fracture from the measured photons. The energy source can comprise, for example, electromagnetic radiation.

An electron/hole pair can be induced to form in a phase of the proppant and generate electrons in-situ. The electrons can further induce the cathodoluminescent material to emit photons. The proppant can further comprise a receiving antenna that transforms the electromagnetic radiation into a flow of electrons. The electrons can then induce the cathodoluminescent material to emit photons.

The frequency (or energy) of the photons depends on the cathodoluminescent material used to generate them. By considering the surrounding formation, the photon frequency (or energy) can be chosen such that the surrounding formation and overburden are effectively transparent to the photons and provide a low impedance path to the progression of the photons from the subterranean locations to the surface locations.

Measuring electrical impedance of functional proppants can be utilized to determine the geometry of a subterranean fracture. The method can include measuring the degree to which an electric circuit resists electric-current flow when a voltage is impressed across two or more terminals of the circuit. The impedance can be expressed in Ohms, as the ratio of the voltage impressed across a pair of terminals to the current flow between those terminals. In direct-current (DC) circuits, impedance corresponds to resistance. In alternating current (AC) circuits, impedance is a function of resistance, inductance, and capacitance. Inductors and capacitors build up voltages that oppose the flow of current. The reactance produced by inductance is proportional to the frequency of the alternating current, whereas the reactance produced by capacitance is inversely proportional to the frequency. This opposition, called reactance, can be combined with resistance to determine the impedance, and impedance measurements using alternating current at various frequencies can be used to determine characteristic features of circuit geometries.

Packed proppants in a subterranean fracture can be treated as a continuous electrical circuit wherein the individual proppants are touching one another. The proppants can be electrically resistive, conductive, or semi-conductive depending on the proppant materials and additives, if present, in the proppant coating. By measuring and modeling the electrical impedance of the proppant pack in a subterranean fracture, the geometry of the subterranean fracture can be determined.

The electrode design for impedance measurements utilizing impedance spectroscopy concepts can be dependent on the particular subterranean fracture being propped. The electrodes can be implemented through the wellbore or through various locations across the predicted fracture geometry. As described elsewhere herein, the electrical resistivity and the electrical impedance can be successfully utilized together to determine a fracture geometry.

The detector can comprise a 2D-array of photomultiplier tubes, a 2D array of photo detectors, or a combination thereof. The array of photomultiplier tubes and/or photo detectors can be arranged, for example, on the surface above the fracture zone. The 2D-array of photomultiplier tubes and/or photodetectors can detect and multiply the photon emissions from the subterranean location, thus allowing "mapping" of the fracture geometry. A detector can be sent down hole to measure and/or record the photons emitted from the near wellbore location, thus allowing mapping of the fracture height and width. The down hole detector can comprise, for example, an array of photomultiplier tubes, an array of photodetectors, photographic film, a CCD device, or any combination thereof.

A method for heating a proppant pack in a fracture in a geologic formation can comprise injecting a proppant into the fracture wherein the proppant comprises carbon nanotubes, carbon nanoparticles, or a combination thereof. The proppant in the fracture can then be irradiated with electromagnetic radiation sufficient to induce the proppant to generate heat. The electromagnetic radiation can have a wavelength in the microwave to radio wave range, for example, of from about 1 millimeter (mm) to about 300 meters (m), about 10 mm to about 300 mm, or about 100 mm.

The heat generated by the proppant can be used, for example, to degrade carrier fluids used to transport the proppants into the fracture. If the gels in a carrier fluid are broken down the viscosity of the carrier fluid can be reduced. The gels can then be removed from the fracture zone effectively through flowback to the wellbore. The heat generated by the proppant can also be used, for example, to reduce the viscosity of crude oil present in the fracture and thus enhance the rate of recovery of hydrocarbons from the formation.

A method for etching rock in a fracture in a geologic formation can comprise injecting a proppant into the fracture, wherein the proppant comprises a ceramic matrix and a chemical, generating a signal to liberate the chemical from the proppant, and contacting the liberated chemical with the rock. The signal can be, for example, a sonic signal, and can be provided, for example, by a sonic signal source. The chemical can comprise, for example, an acid. The acid can etch the rock present in the fracture and thus enhance conductivity from the formation.

As another example of the present invention, the proppant can comprise explosive material which is coated with polymer or ceramic materials. As the proppant is injected into the fracture, pressure, temperature, or chemical leaching (e.g. acid) through the coating layer can detonate the explosive embedded in the proppant, and thereby generate a sonic signal or micro seismic event that can be detected, such as a distinctive sonic signal or micro seismic wave. The sonic signal can be captured by geophone installed on the ground or other detecting devices, such as tiltmeters that detect sonic or micro seismic event signals. The explosive containing proppant can be used in combination with conventional or regular proppant(s) that are not used for detecting but used to prop. The explosive containing proppant can be present with the conventional or regular proppant in any amount, such as a concentration of from about 0.1 wt % to 5 wt % or more, or from 1 wt % to 5 wt %, preferably less than 2 wt %, based on the overall weight of the proppant present.

The use of a sonic signal to induce vibration can be coupled with other detection methods so as to achieve synergistic effects. The detection of length, width, and height can be achieved using a reflected signal to generate the sound wave. A ceramic transducer/piezoelectric element can be used. The return signal can be measured with a ceramic microphone. A hollow proppant can maximize the signal. The use of a hollow structure would act as a resonant cavity at the correct frequency. This would lead to more of the wavefront energy is absorbed rather than being reflected back to the sonic wave emitter. Thus, knowing the absorption coefficient of the hollow proppant at a number of selected frequencies would allow the determination of the length of the proppant bed through time of flight type experiments. The hollow proppant having a higher absorption coefficient than the surrounding formation would give the ability to delineate the proppant bed boundaries in the sub-terranean formation.

Proppants settled down into a hydrofracture can be detected using ultra-sonic waves. An ultra-sound transducer can be placed in a wellbore and can be made to generate ultra-sonic acoustic waves through the nearby geological structure. There are at least two modes of ultra-sound that can be detected, reflective ultrasound and transmission ultrasound.

For detection using reflective ultra-sound, a receiver can be integrated with a transducer. A sound wave can be sent through a geological structure until it hits a fracture surface where the density of material abruptly changes, for example, a change from proppant pack to rock surface. Certain ultra-sound waves are then reflected back to the source. Based on phase change of the ultra-sound waves, the distance between the source of the ultra-sound and the reflective surface can be estimated and the location of proppant and/or a fracture surface can be located.

When a transmission mode is utilized, the ultra-sound travels through the fracture and the nature of the fracture changes the ultra-sound wave. A detector placed in a different wellbore or hole than from where the ultra-sound was generated, can be used to detect the transmitted, altered ultra-sound wave. The information from the detector can be interpreted with the ultra-sound wave pathway and the location of proppants can be determined.

Fiber optics can be used in the detection of temperature and pressure in a wellbore or near the wellbore. Fiber-clad grading techniques can be utilized to enable the optical fiber to operate as a sensor. When teamed with an appropriate transducer, an optical signal can be transmitted to the Earth's surface and endoscopy can be used to measure the optical signal. Alternatively, the optical signal can be measured using an IR spectroscope.

The proppants can have a layer or core of quantum dots (QDs) (e.g., which can be nanocrystals on the order of 1 nm to 50 nm, such as 1 nm to 10 nm), which serve as the functional component herein, and can be tracked, traced or otherwise identified by devices described herein. The quantum dots are conventional in the art and can be excited by various energy sources, such as lasers, LEDs, and the like. The QDs can comprise a core of CdS, CdSe, CdTe, ZnS, ZnSe, ZnTe, GaAs, GaP, GaAs, GaSb, HgS, HgSe, HgTe, InAs, InP, InSb, AlAs, AlP, AlSb, an alloy thereof, or a mixture thereof, and are, optionally, overcoated with a shell material comprising ZnO, ZnS, ZnSe, ZnTe, CdO, CdS, CdSe, CdTe, MgS, MgSe, GaAs, GaN, GaP, GaAs, GaSb, HgO, HgS, HgSe, HgTe, InAs, InN, InP, InSb, AlAs, AlN, AlP, AlSb, an alloy thereof, or a mixture thereof. The QDs are small enough to be incorporated into and/or on the proppant as part of a layer, as its own layer, or as part of the core or its own core. The QDs can have chemical groups that permit them to be reacted or otherwise physically or chemically attached onto the proppant or part thereof and can be detached by desorption or other means, dissolving, reaction, and the like.

The present invention also relates to a proppant having a functional component that permits the proppant to react or otherwise alter the carrier fluid of the proppant so that the carrier fluid is the substance that can be tracked, mapped or otherwise traced in the fracture or wellbore, so that the carrier fluid is the tracking or tracing mechanism. The proppant can also, in addition, serve this purpose as well in this embodiment. This embodiment has the advantage in that the fluid better defines the fracture since it is a liquid and better represents the location of the proppant and carrier fluid then proppants alone. The tracking of the carrier fluid provides a more accurate understanding of the fracture, the locations of the carrier fluid and proppants, then the proppants alone. For instance, a layer on the proppant can dissolve once in contact with the carrier fluid (such as an acid or base or other reactive chemical or marker) that then permits the carrier fluid to be traced by one or more of the techniques described herein—radar, magnetic, SQUID, light energy, vibration energy, temperature (elevated or decreased). As a further example, the proppant can have a layer on the surface that causes an exothermic reaction in the carrier fluid causing a temperature rise and this temperature increase can be monitor on the surface of the wellbore or elsewhere by temperature probes or IR or UV or other detection techniques. As another example, the proppants can have a layer or substance that causes the carrier fluid to emit a different wavelength that can be detected. For instance, the proppants can release a quantum dot particle or substance that can dissolve, react, or otherwise be present in the carrier fluid and be detected, such as by being excited by wavelengths or other energy.

A fluid containing chemicals or short half-life radioactive materials can be used to determine a fracture geometry. Proppants with different specific gravities can be pumped into a formation, for example, in various stages. Different chemical trackers either in solid or liquid form, for example, radioactive elements, colored ink, and/or chemical tags, can be incorporated into the proppants.

As the proppant is pumped into a fracture, pressure is released through pumping water back up to the Earth's surface, but pressure on the proppant is nonetheless increased. The proppant can be designed such that, under these conditions, a small portion of the proppant particles are crushed, releasing liquid or solid chemicals into the carrier fluid. The chemical trackers can then be detected through various techniques such as infrared imaging, nuclear magnetic resonance spectroscopy, or the like, at or near the wellbore. The distance of the settled proppants from the wellbore can be calculated based on the rate of back flow and time.

In the present invention, the active components can be coated with ceramic materials or polymers or metals, or any combinations of above. The coating can be applied through conventional processes such as dip coating, spinning coating, spray coating, sol-gel coating, physical vapor deposition, chemical vapor deposition, in-situ suspension polymerization, coating precipitation, spray drying, pan coating, mechanical fluid bed coating, fluid bed coating, thermal spray coating or any combination of the above processes.

In the present invention, the proppants with the one or more functional components have the advantage in that the proppants, themselves, can serve multiple purposes. In particular, the proppants have the ability to prop open fractures as conventional proppants and further have the ability to provide a means to track and trace the location of the proppant and/or track and trace and determine the characteristics of the fracture. Prior proppants did not have this dual purpose-meaning, the proppant either was a proppant to prop open the fracture, or the proppant was a tracking material and in reality was not capable of acting as a proppant due to insufficient crush strength, chemical resistance, specific gravity, size, cost, or any combination of these factors. In the present invention, the proppants introduced into the well or fracture can all have the functional component(s) or a portion can have them. If a portion is used, the remaining portion can be any type of conventional proppants, and/or can be the proppants described in the patent applications referenced herein. The portion used in the present invention can be 99% or less of the overall weight of proppants introduced, such as from 0.5% to 95%, 10% to 90%, 20% to 75%, 40% to 60% and like, based on the overall total weight of proppants introduced. The portion can be introduced separately from the remaining proppants, can be introduced as a mixture, can be introduced in sequential stages. With the present invention, the proppants having the functional component(s) can have one or more of the properties of the proppants described in the patent applications referenced above, including, but not limited to, the ingredients, the core, the layer or layers, the size, the thickness of the layers, uniformity of the core and/or layer(s), specific gravity, crush strength of the proppant, crush strength of the layer(s), crush strength of the core, methods of preparation, methods of introduction. As stated, the proppants have the added functional component as described herein to provide the tracking and mapping ability. The manner in which the proppants are made and the properties of the proppants as described in the above referenced patent applications make them ideal for incorporating a functional component(s) and yet achieve desirable and acceptable proppant properties for use as a proppant as well as for tracking and mapping.

As another option, detection of signals like acoustical and/or electromagnetic signature differences from porous and hollow proppants vs. solid proppants can be done. Detection tools include microseismic, seismic, radiation, magnetometers, accelerometers, and/or gravitometers. All of the assorted instruments described previously could be nanoenhanced or MEM-enhanced. As an option, the proppants can include a hollow sphere or include a hollow portion(s) or porous portion(s) as part of the proppants. The hollow characteristic allows the proppant to generate a different signature compared to its surroundings in the formation and/or compared to solid proppants or otherwise different proppants that can also be present, so as to permit mapping of it. Using one or more of the sources described herein to generate a signal(s) to where the proppants were pumped, the signal(s) will have a different effect on the proppants than the surrounding formation and thus enable detection with respect to location and concentration. In more detail, the seismic or vibrational or heat signals from the sources described in present invention pass through the hollow proppants and will have different conductivities than the geological materials in the earth in terms of signal frequency and/or signal strength attenuation and/or other signal difference. The detection system can then measure, record, and/or detect the signals at various locations and can then be processed. The difference in signal frequency and/or strength attenuation and/or other signal difference at various locations can be correlated to information about fracture height, fracture width, fracture depth, and/or fracture trajectory (i.e., azimuth, inclination, declination, deviations in path, and the like. Essentially, a 2-D or 3-D understanding of the proppant location and distribution in the formation can be achieved.

The data collected by the tools and instrumentation previously described can be a composite data packet that is due to the superposition of a multiplicity of frequencies and/or waveforms. Each component of the composite data packet or signal can be due to a unique event occurring at a unique location within the fractured formation or proppant pack. Deconvolution of the composite data packet or signal is required to characterize these unique events. This deconvolution may be carried out by subjecting the composite data packet or signal to a mathematical treatment. Examples of such mathematical treatments include Continuous Fourier Transforms (CFT), Discrete Time Fourier Transforms (DTFT), Discrete Fourier Transforms (DFT), Fractional Fourier Transforms (FFT), Fourier Series (FS), Laplace Transforms (LT), Two Sided Laplace Transforms (TSLT), Spectral Density Analysis (SDA), Spectral Density Estimation (SDE) and the like.

In general, for any of the methods and embodiments of the present invention, the proppants of the present invention can be used in combination with conventional proppants and/or proppants not used to map or track location. A plurality of proppants can be introduced into the formation and the percentage of proppants that are present for tracking or mapping ability can be any amount, such as from 0.1 wt % to 100 wt %, or from 1 wt % to 75 wt %, or from 1 wt % to 50 wt %, or from 1 wt % to 25 wt %, or from 1 wt % to 15 wt %, or from 1 wt % to 10 wt % or from 1 wt % to 5 wt % or from 1 wt % to 3 wt % of the overall proppants added during the propping stage.

Accordingly, the present invention can relate to the following embodiments in any combination:

1.) A proppant particle comprising:
a ceramic matrix; and
a functional component comprising a d-block element from the Periodic Table of Elements.

2.) The proppant particle of any preceding embodiment, wherein the functional component is distributed substantially throughout the ceramic matrix.

3.) The proppant particle of any preceding embodiment, wherein the functional component is incorporated in the proppant particle as a discrete phase.

4.) The proppant particle of any preceding embodiment, wherein the functional component is incorporated in the proppant particle as a solid solution, an alloy, or any combination thereof, with the ceramic matrix or a polymer, in one or more layers and substantially overcoated with a layer of the ceramic matrix or a polymer.

5.) The proppant particle of any preceding embodiment, comprising a core of functional component substantially overcoated with the ceramic matrix.

6.) The proppant particle of any preceding embodiment, wherein the functional component comprises a metallic particulate, an oxide particulate, or any combination thereof, of a d-block element from the Periodic Table of Elements.

7.) The proppant particle of any preceding embodiment, wherein the functional component comprises a d-block element from period 4 through period 6 of the Periodic Table of Elements.

8.) The proppant particle of any preceding embodiment, wherein the functional component comprises vanadium, chromium, manganese, iron, cobalt, nickel, zirconium, niobium, molybdenum, rhodium, palladium, yttrium, scandium, hafnium, tantalum, tungsten, platinum, conductive or semi-conductive polymer, conductive or semi-conductive pigment, or any combination thereof.

9.) A proppant particle comprising:
a ceramic matrix; and
a core of functional component comprising pyrolytic carbon, conductive graphite, or any combination thereof, wherein the core of functional component is substantially or fully overcoated with the ceramic matrix.

10.) The proppant particle of any preceding embodiment, wherein the proppant particle is sintered using rapid rate sintering, inert sintering, electromagnetic field sintering, microwave sintering, inductively coupled sintering, or any combination thereof.

11.) A proppant particle comprising:
a ceramic matrix; and
a functional component comprising a piezoelectric material.

12.) The proppant particle of any preceding embodiment, wherein the functional component is distributed substantially throughout the ceramic matrix.

13.) The proppant particle of any preceding embodiment, wherein the functional component is incorporated in the proppant particle as a discrete phase in at least one layer substantially overcoated with the ceramic matrix or a polymer.

14.) The proppant particle of any preceding embodiment, comprising a core of functional component substantially or fully overcoated with the ceramic matrix or a polymer.

15.) The proppant particle of any preceding embodiment, further comprising one or more antenna-type device electrically coupled to the piezoelectric material, wherein upon irradiation of the proppant particle with an electromagnetic field, the one or more antenna-type device induces an electric current that generates a contraction or an expansion of the piezoelectric material.

16.) The proppant particle of any preceding embodiment, wherein the one or more antenna-type device comprises a metal particle, a metal fiber, or any combination thereof.

17.) The proppant particle of any preceding embodiment, wherein the one or more antenna-type device is located in the proppant particle such that the antenna-type device radiates in an outward direction.

18.) The proppant particle of any preceding embodiment, comprising a plurality of antenna-type devices electrically coupled to the piezoelectric material, wherein each antenna-type device is located in the proppant particle such that antenna-type device radiates in an outward direction.

19.) The proppant particle of any preceding embodiment, wherein the contraction or expansion of the piezoelectric material induces a vibration of the proppant particle.

20.) The proppant particle of any preceding embodiment, wherein the electromagnetic field is an alternating electromagnetic field having an excitation frequency, and the vibration of the proppant particle has a vibration frequency that is a function of the excitation frequency.

21.) The proppant particle of any preceding embodiment, wherein the vibration frequency is about equal to the excitation frequency.

22.) The proppant particle of any preceding embodiment, wherein the piezoelectric material comprises a ceramic material having a perovskite-type crystal structure.

23.) The proppant particle of any preceding embodiment, wherein the piezoelectric material comprises lead zirconium titanate, barium titanate, lead niobate, a channel-cut quartz single crystal, a doped titanate having a perovskite structure, or any combination thereof.

24.) A proppant particle comprising:
a ceramic matrix; and
a functional component comprising a cathodoluminescent material.

25.) The proppant particle of any preceding embodiment, wherein the functional component is distributed substantially throughout the ceramic matrix.

26.) The proppant particle of any preceding embodiment, wherein the functional component is incorporated in the proppant particle as a discrete phase in at least one layer substantially or fully overcoated with the ceramic matrix or a polymer.

27.) The proppant particle of any preceding embodiment, comprising a core of functional component substantially or fully overcoated with the ceramic matrix or a polymer.

28.) The proppant particle of any preceding embodiment, wherein upon irradiation of the proppant particle with an energy source, the cathodoluminescent material emits light photons.

29.) The proppant particle of any preceding embodiment, wherein the energy source comprises electromagnetic radiation.

30.) The proppant particle of any preceding embodiment, wherein the cathodoluminescent material comprises a phosphor, yttrium iron garnet, manganese doped magnesium aluminosilicate glass, or any combination thereof.

31.) The proppant particle of any preceding embodiment, further comprising an antenna-type device, wherein upon irradiation of the proppant particle with an electromagnetic field, the antenna-type device induces a flow of electrons that excite the cathodoluminescent material to induce photon emission.

32.) A proppant particle comprising:
a ceramic matrix; and
a functional component comprising carbon nanotubes, carbon nanoparticles, or a combination thereof.

33.) The proppant particle of any preceding embodiment, wherein the carbon nanotubes comprise single wall nanotubes, multi-wall nanotubes, armchair nanotubes, zig-zag nanotubes, helical nanotubes, bundles of single wall nanotubes, bundles of multi-wall nanotubes, or any combination thereof.

34.) The proppant particle of any preceding embodiment, wherein the carbon nanoparticles comprise spheres, layered spheres, platelets, grains, agglomerated spheres, plates, rods, single hexagonal planes, or any combination thereof.

35.) The proppant particle of any preceding embodiment, wherein the functional component is distributed substantially throughout the ceramic matrix or a polymer.

36.) The proppant particle of any preceding embodiment, wherein the functional component is incorporated in the proppant particle as a discrete phase in at least one layer substantially overcoated with the ceramic matrix or a polymer.

37.) The proppant particle of any preceding embodiment, comprising a core of functional component substantially overcoated with the ceramic matrix or a polymer.

38.) The proppant particle of any preceding embodiment, wherein upon irradiation of the proppant particle with electromagnetic radiation, the functional component absorbs a portion of the electromagnetic radiation.

39.) The proppant particle of any preceding embodiment, wherein the electromagnetic radiation has a wavelength from about 0.25 millimeter to about 1 meter.

40.) The proppant particle of any preceding embodiment, wherein upon irradiation of the proppant particle with an electromagnetic field, the functional component generates heat.

41.) The proppant particle of any preceding embodiment, further comprising a silica core, wherein the silica core is substantially or fully coated with carbon nanotubes, and the carbon nanotubes are substantially or fully overcoated with the ceramic matrix or a polymer.

42.) A proppant particle comprising:
a ceramic matrix; and
a functional component comprising a reactive compound.

43.) The proppant particle of any preceding embodiment, wherein the reactive compound comprises an acid, a base, or any combination thereof.

44.) The proppant particle of any preceding embodiment, wherein the functional component is distributed substantially throughout the ceramic matrix or a polymer.

45.) The proppant particle of any preceding embodiment, wherein the functional component is incorporated in the proppant particle as a discrete phase in at least one layer substantially or fully overcoated with the ceramic matrix or a polymer.

46.) The proppant particle of any preceding embodiment, comprising a core of functional component substantially or fully overcoated with the ceramic matrix or a polymer.

47.) The proppant particle of any preceding embodiment, wherein the reactive compound is released from the proppant particle upon subjecting the proppant particle to a signal.

48.) The proppant particle of any preceding embodiment, wherein the signal comprises a sonic signal.

49.) The proppant particle of any preceding embodiment, wherein the proppant particle absorbs the reactive compound, stores the reactive compound, and releases the reactive compound when subjected to a signal.

50.) A proppant particle comprising:
a ceramic matrix; and
a functional component comprising a magnetic, supermagnetic, or paramagnetic material.

51.) The proppant particle of any preceding embodiment, wherein the functional component is distributed substantially throughout the ceramic matrix or a polymer.

52.) The proppant particle of any preceding embodiment, wherein the functional component is incorporated in the proppant particle as a discrete phase in one or more layer substantially overcoated with a layer of the ceramic matrix or a polymer.

53.) The proppant particle of any preceding embodiment, wherein the functional component is distributed within an outer layer of the ceramic matrix or a polymer.

54.) The proppant particle of any preceding embodiment, wherein the functional component comprises an iron oxide.

55.) The proppant particle of any preceding embodiment, wherein the functional component comprises a ferrite.

56.) The proppant particle of any preceding embodiment, wherein the ferrite comprises a Mn—Zn ferrite of the formula $Mn_xZn_{1-x}Fe_2O_4$, wherein x is any number in a range between 0 and 1, with the proviso that x can not equal 0 or 1.

57.) A method for determining the geometry of a fracture in a geologic formation, the method comprising:
positioning a detector in a position to measure a magnetic field generated from the geologic formation;
injecting a proppant into the fracture wherein the proppant comprises a d-block element from the Periodic Table of Elements;
measuring the magnetic field generated from the geologic formation; and
determining the geometry of the fracture from the measured magnetic field.

58.) The method of any preceding embodiment, wherein the detector comprises one or more magnetometers.

59.) The method of any preceding embodiment, wherein the detector comprises one or more airborne magnetometers.

60.) The method of any preceding embodiment, wherein the detector comprises one or more superconducting quantum interference device (SQUID).

61.) The method of any preceding embodiment, further comprising injecting a fracturing fluid into a wellbore in fluid communication with the fracture at a pressure high enough to allow the fracturing fluid to extend the fracture, wherein the fracturing fluid comprises a proppant particle comprising a ceramic matrix and a d-block element from the Periodic Table of Elements.

62.) A method for determining the geometry of a fracture in a geologic formation, the method comprising:
positioning one or more electrodes in a position to measure the electrical resistance of the geologic formation;
injecting a proppant into the fracture wherein the proppant comprises a d-block element from the Periodic Table of Elements;
measuring the electrical resistance of the geologic formation; and
determining the geometry of the fracture from the measured electrical resistance.

63.) The method of any preceding embodiment, further comprising injecting a fracturing fluid into a wellbore in fluid communication with the fracture at a pressure high enough to allow the fracturing fluid to extend the fracture, wherein the fracturing fluid comprises a proppant particle comprising a ceramic matrix and a d-block element from the Periodic Table of Elements.

64.) A method for determining the geometry of a fracture in a geologic formation, the method comprising:
positioning a ground penetrating radar detector in a position to radiate electromagnetic signals into the geologic formation and to detect electromagnetic signals reflected from the geologic formation;
injecting a proppant into the fracture wherein the proppant comprises a d-block element from the Periodic Table of Elements;
radiating electromagnetic signals into the geologic formation;
measuring electromagnetic signals that are reflected from the geologic formation; and
determining the geometry of the fracture from the reflected electromagnetic signals.

65.) The method of any preceding embodiment, further comprising injecting a fracturing fluid into a wellbore in fluid communication with the fracture at a pressure high enough to allow the fracturing fluid to extend the fracture, wherein the fracturing fluid comprises a proppant particle comprising a ceramic matrix and a d-block element from the Periodic Table of Elements.

66.) A method for determining the geometry of a fracture in a geologic formation, the method comprising:
positioning a detector in a position to measure vibrations from the geologic formation;
injecting a proppant into the fracture wherein the proppant comprises a piezoelectric material and an antenna-type device electrically coupled to the piezoelectric material;
irradiating the geologic formation with alternating electromagnetic radiation sufficient to generate an electric current in the antenna-type device;
exciting the piezoelectric material with the electric current to induce the piezoelectric material to cause vibrations;
measuring the frequency of the vibrations; and
determining the geometry of the fracture from the measured vibrations.

67.) The method of any preceding embodiment, further comprising injecting a fracturing fluid into a wellbore in fluid communication with the fracture at a pressure high enough to allow the fracturing fluid to extend the fracture, wherein the fracturing fluid comprises a proppant particle comprising a ceramic matrix, an antenna-type device, and a piezoelectric material.

68.) The method of any preceding embodiment, wherein the detector comprises one or more accelerometers.

69.) The method of any preceding embodiment, wherein the detector comprises one or more geophones.

70.) The method of any preceding embodiment, wherein the alternating electromagnetic radiation has a frequency that is sinusoidal, triangular, squared, pulsed, or a combination thereof.

71.) The method of any preceding embodiment, wherein the vibration of the piezoelectric material has a vibration frequency that is a function of the frequency of the alternating electromagnetic radiation.

72.) The method of any preceding embodiment, further comprising measuring the time of flight of the induced vibrations and determining the depth of the fracture from the measured time of flight.

73.) The method of any preceding embodiment, wherein the antenna-type device comprises a metallic fiber, the metallic fiber having a length that is a whole multiple of the wavelength of the electromagnetic radiation.

74.) The method of any preceding embodiment, wherein the alternating electromagnetic radiation has a frequency from 50 Hz to 1200 GHz.

75.) A method for determining the geometry of a fracture in a geologic formation, the method comprising:
positioning a detector in a position to measure photons emitted from the geologic formation;
injecting a proppant into the fracture wherein the proppant comprises a cathodoluminescent material;
irradiating the proppant with an energy source sufficient to induce the cathodoluminescent material to emit photons;
measuring the photons emitted from the geologic formation; and
determining the geometry of the fracture from the measured photons.

76.) The method of any preceding embodiment, further comprising injecting a fracturing fluid into a wellbore in fluid communication with the fracture at a pressure high enough to cause the fracturing fluid to extend the fracture, wherein the fracturing fluid comprises a proppant particle comprising a ceramic matrix and a cathodoluminescent material.

77.) The method of any preceding embodiment, wherein the energy source comprises an electromagnetic radiation source.

78.) The method of any preceding embodiment, wherein the proppant further comprises a receiving antenna that transforms the electromagnetic radiation into a flow of electrons, and the electrons induce the cathodoluminescent material to emit photons.

79.) The method of any preceding embodiment, further comprising inducing an electron/hole pair formation in a phase of the proppant, and generating electrons in-situ, wherein the electrons induce the cathodoluminescent material to emit photons.

80.) The method of any preceding embodiment, wherein the detector comprises a 2D array of photomultiplier tubes, a 2D array of photodetectors, or a combination thereof, arranged on a surface above the fracture.

81.) The method of any preceding embodiment, wherein the detector is sent down hole to measure the photons emitted from the geologic formation.

82.) The method of any preceding embodiment, wherein the detector comprises an array of photomultiplier tubes, an array of photodetectors, photographic film, a CCD device, or a combination thereof.

83.) A method for heating a proppant pack in a fracture in a geologic formation, the method comprising:
providing a source of electromagnetic radiation;
injecting a proppant into the fracture, wherein the proppant comprises carbon nanotubes, carbon nanoparticles, or a combination thereof; and
irradiating the proppant with electromagnetic radiation sufficient to induce the proppant to generate heat.

84.) The method of any preceding embodiment, wherein the electromagnetic radiation has a wavelength of from about 1 millimeter to about 1 meter.

85.) The method of any preceding embodiment, wherein the proppant further comprises a carrier fluid and the method comprises generating a sufficient amount of heat to degrade the carrier fluid.

86.) The method of any preceding embodiment, wherein crude oil is present in the fracture, the irradiating comprises generating sufficient heat to reduce the viscosity of the crude oil, and the method further comprises recovering the crude oil.

87.) A method for etching rock in a fracture in a geologic formation, the method comprising:
injecting a proppant into the fracture wherein the proppant comprises a ceramic matrix and an etching chemical;
generating a sonic signal from a sonic signal source, of sufficient strength to liberate the etching chemical from the proppant;
contacting the rock with the liberated etching chemical; and
etching the rock with the etching chemical.

88.) The method of any preceding embodiment, wherein the etching chemical comprises an acid.

89.) A proppant particle comprising:
a glass-ceramic matrix; and
a functional component comprising magnetite.

90.) The proppant particle of any preceding embodiment, wherein the functional component is distributed throughout the glass-ceramic matrix.

91.) The proppant particle of any preceding embodiment, wherein the functional component is incorporated in the proppant particle as one or more discrete phases.

92.) The proppant particle of any preceding embodiment, wherein the glass-ceramic matrix comprises aluminosilicate.

93.) The proppant particle of any preceding embodiment, wherein the magnetite is present in an amount of from 15 percent by weight to 20 percent by weight of the proppant particle.

94.) The proppant particle of any preceding embodiment, further comprising a crystallization modifier.

95.) The proppant particle of any preceding embodiment, further comprising soda, potassia, magnesia, calcia, titania, zinc oxide, or a combination thereof.

96.) The proppant particle of any preceding embodiment, wherein the functional component is incorporated in the proppant particle as a discrete phase in at least one layer substantially overcoated with a layer of the glass-ceramic matrix.

97.) The proppant particle of any preceding embodiment, further comprising a particulate, wherein the glass-ceramic matrix is bonded to the particulate in the form of a glassy composite.

98.) The proppant particle of any preceding embodiment, wherein the particulate comprises a glass-ceramic material.

99.) The proppant particle of any preceding embodiment, wherein the particulate comprises crystalline aluminosilicate.

100.) The proppant particle of any preceding embodiment, wherein the particulate comprises magnetite.

101.) A method for determining the geometry of a fracture in a geologic formation, the method comprising:
positioning a detector in a position where it is operable to measure sonic signals emitted from the geologic formation;
injecting a proppant into the fracture, the proppant comprising an explosive material;
detonating the explosive material to generate a sonic signal;

detecting the sonic signal; and determining the geometry of the fracture from the sonic signal detected.

102.) The method of any preceding embodiment, wherein said sonic signal is measured with a geophone positioned at a surface of the geologic formation.

103.) The method of any preceding embodiment, wherein said detonating is triggered by fracturing, pressure, temperature, or chemical leaching, within the geologic formation.

104.) The method of any preceding embodiment, further comprising pumping a second proppant into the fracture after the detonating, to prop open the fracture.

105.) A method for determining the geometry of a fracture in a geologic formation, the method comprising:

providing one or more devices to generate signals in the geologic formation, the signals comprising acoustic, seismic, vibrational, magnetic, electrical, electromagnetic, and/or heat signals;

providing one or more devices to detect the signals in the geologic formation;

injecting a proppant pack into the fracture, wherein the proppants of the proppant pack comprise a signal-transforming attribute configured to transform signals generated by the one or more devices to generate signals;

generating signals in the geologic formation, using the one or more devices to generate signals;

transforming the signals generated, with the proppant pack, to form transformed signals;

measuring the transformed signals; and determining the geometry of the fracture using the measured transformed signals.

106.) The method of any preceding embodiment, wherein the one or more devices to generate signals comprises an ultrasound generating device.

107.) The method of any preceding embodiment, wherein the one or more devices to generate a signal comprises an electrical signal generating device, and the one or more devices to detect comprises an impedance measurement device.

108.) The method of any preceding embodiment, wherein the one or more devices to generate a signal comprises an electrical signal generating device and the one or more devices to detect comprises a piezoelectric detector.

109.) The method of any preceding embodiment, wherein the piezoelectric detector detects vibrational amplitude using atomic force microscopy.

110.) The method of any preceding embodiment, wherein the one or more devices to detect comprises an optical detector that detects optical signals carried by fiber optics.

111.) The method of any preceding embodiment, wherein the one or more devices to detect comprises an array of accelerometers and the transformed signals comprise gravitational field strength signals.

112.) The method of any preceding embodiment, wherein the proppant pack comprises a mixture of piezoelectric crystals comprising electrodes and electrically conductive proppants.

113.) A method for determining the geometry of a fracture in a geologic formation, the method comprising:

injecting a proppant pack into the fracture, wherein the proppants of the proppant pack comprise a radioactive component;

generating radioactive signals in the geologic formation, with the radioactive component;

measuring the radioactive signals; and determining the geometry of the fracture using the measured radioactive signals.

114.) The method of any preceding embodiment, wherein the radioactive component comprises chemical tags incorporated into the proppants, and the method further comprises pressuring the proppants to crush at least a portion of the proppants and release the chemical tags.

115.) The method of any preceding embodiment, wherein the measuring comprises measuring neutron activated emissions and the method further comprises irradiating the proppant pack with a neutron source after the proppant pack is injected into the fracture.

116.) The method of any preceding embodiment, wherein the radioactive component comprises an element that is activated by neutron capture and the method further comprises activating the element prior to injecting the proppant pack into the fracture.

The present invention will be further clarified by the following examples, which are intended to be exemplary of the present invention.

THEORETICAL EXAMPLES

Example 1

The template material is first coated with a barrier coating consisting of a ceramic material that may or may not be the same as the ceramic material that provides the strength to the proppant. The thickness of this barrier layer is such that a uniform surface is provided for the application of the piezoelectric phase. The thickness of this barrier layer is 5±2 microns. The piezoelectric phase is then applied, over coating the barrier layer. The thickness of the piezoelectric phase is dependent upon the amplitude of the signal that is required to be generated, for this example the thickness of the piezoelectric phase would be 15±5 microns. The piezoelectric phase material used in this example is called PZT, which comprises a solid solution of lead, zirconia and titania, which is essentially a titanate based ceramic material with a perovskite type crystal structure. The antenna assembly is next applied which comprises an intimate mixture of nickel oxide and ceramic material with a concentration of nickel oxide powder of approximately 30 wt %. The thickness of this combined antenna and ceramic matrix layer is 30±5 microns. Sintering of the coated assembly is carried out in air at approximately 1300° C. for 120 minutes.

Example 2

Example 2 follows the same process as Example 1, however during the application of the antenna ceramic matrix assembly, the nickel oxide is replaced with polymeric fibers with a diameter of 0.5±0.1 microns and a length of 10±1 microns. Sintering of the coated assembly causes pyrolysis of the polymeric fibres, producing channels in the ceramic matrix. Following sintering, the sensor proppant assembly is submerged in a nickel bearing solution to infiltrate the channels formed. Drying of the infiltrated assembly is carried out at 110° C. for 12 hours followed a subsequent infiltration. These drying and infiltrating stages are repeated 3 times to allow complete filling of the channels in the ceramic matrix. Following the final drying stage, the assembly is sintered at 1200° C. for 180 minutes in a reducing atmosphere consisting of carbon monoxide, yielding nickel fibers (or rods) one end of which is in direct contact with the piezoelectric phase.

Example 3

Identical to Example 2 with the exception that the nickel bearing solution is replaced with a silver bearing solution to form silver fibers/rods to behave as antenna elements.

Example 4

In this example, the template is coated with a barrier coating of approximately the same dimensions as Example 1. Over the barrier coating is applied a piezoelectric phase of approximately 15±5 microns. Over the top of the piezoelectric phase is a thin layer, approximately 5±2 microns thick of a conductive metallic phase. The metallic phase layer is overcoated with a thin cordierite ceramic layer, with a mean thickness of 2±1 microns. Due to the thin ceramic layer, the coating will tend to form islands of ceramic materials, with regions of uncoated metallic phase. The assembly is subjected to a heat treatment at a temperature of approximately 1300° C. for 120 minutes. The uncoated regions of the metallic phase will preferentially melt and evaporate from the surface of the assembly. Subsequent to this heat treatment, the structural ceramic layer, with a thickness of 35±5 microns, is applied using a fluid bed coating system. Heat treatment of the final assembly is carried out at 1250° C.-1300° C. for 180 minutes to effect densification of the final ceramic layer. The final assembly consists of metallic antenna devices in intimate contact with the piezoelectric phase layer and encapsulated by the dense high strength ceramic layer.

Example 5

In this example, the template is coated with a barrier coating of approximately the same dimensions as Example 1. Over the barrier coating is applied a piezoelectric phase of approximately 15±5 microns. A thin metallic phase, of approximately 5±2 microns, is applied to the surface of the piezoelectric material. Following application of the metallic phase, etching of selected areas are carried out to remove designated portions of the metallic phase, yielding thin regions of metal that serve as antennae to provide the electric current (under the influence of an electromagnetic wave) required to drive the piezoelectric phase. The selective removal of the metallic phase may be carried out by masking selected areas of the metallic surface followed by chemical etching to dissolve the unmasked regions. Subsequent to chemical etching, the structural ceramic layer, with a thickness of 35±5 microns, is applied using a fluid bed coating system. Heat treatment of the final assembly is carried out at 1250° C.-1300° C. for 180 minutes to effect densification of the final ceramic layer. The final assembly consists of metallic antenna devices in intimate contact with the piezoelectric phase layer and encapsulated by the dense high strength ceramic layer.

Example 6

In this example, the coated template is subjected to a heat treatment at a temperature between 1250° C. and 1300° C. for up to 180 minutes. Heat treatment of the coated template yields a dense, high strength system capable of withstanding the required closure pressure to be encountered in the subterranean formation. The heat treated assembly is overcoated with a corrosion resistant metallic phase (e.g. Cr), the thickness of the metallic layer being 15±2 microns. The metallic phase coated particles (proppant particles) are placed in the subterranean formation during the completion stage of the well. Detection of the placed proppant may be carried out by way of earth resistivity measurements. An assembly of 4 electrodes, in a linear arrangement, is driven into the earth above the propped region to a specified depth. An alternating current is applied to the two outer electrodes and the resulting potential difference appearing across the two inner electrodes measured. The magnitude of this potential difference is a function of the resistivity of the volume of earth immediately below the electrode assembly. This resistivity is dependent upon the soil type, rock type and fluid type. The proppant, being highly conductive and thus of a low resistivity, would produce a large potential difference and hence a high level of contrast between the propped areas and the surrounding formation.

Example 7

The proppant of Example 6 may be detected by characterizing the perturbations in the earth's magnetic field due to the addition of a paramagnetic phase. Prior to placement in the subterranean formation, a magnetic survey of the region is carried out to characterize the existing magnetic field flux vectors in the region. Following placement of the proppant of Example 6, the magnetic survey is repeated. Perturbations in the magnetic field flux vectors may be attributed to the presence of the paramagnetic phase in the subterranean formation, thus the extent of the propped area may be deduced by analysis of these perturbations.

Example 8

The proppant as described in Example 6 may be used to effect heating of the subterranean formation. A radiative element is lowered down the wellbore to the level of the propped zone. The radiative element is energized with an alternating electric current. The alternating electric field in the radiative element gives rise to the emission of an electromagnetic wave from the radiative element. The interaction of the electromagnetic wave with the metallic phase of the proppant will give rise to the generation of eddy currents within the metallic phase and hence localized heating of each proppant particle. The magnitude of the heating is dependent upon the root mean square (rms) power emission from the radiative element and frequency of the electromagnetic wave, which is dependent upon the frequency of the alternating electric current supplied to the radiative element.

Example 9

The proppants as described in Examples 1-5 may be used to produce an acoustic emission that may be detected at the surface. An array of high sensitivity, unidirectional geophones are laid out on the surface above the formation of interest in specified manner. A brief pulse with known duration of electromagnetic energy is used to stimulate the piezoelectric elements, thus yielding a brief pulse of acoustic energy that propagates through the formation. Detection of the acoustic pulse by the geophones would allow the determination of the length of the propped area. In addition, measuring the time of flight of the acoustic wave will allow the determination of the depth of the propped region. The system may be calibrated by measuring the time of flight of the acoustic wave at the wellbore, the depth of the propped region at the wellbore is known, and thus the velocity of the acoustic wave in the formation may be determined. This velocity value may then be used to calculate the depth at other regions from the time of flight measurements. From the data collected by the array of geophones, the trajectory of the propped area may be determined in both the horizontal and vertical directions.

Example 10

The following examples show exemplary ways of determining fracture properties using acoustic means. Consider a simple subterranean fracture, radiating outwards from the wellbore and containing a packed bed of proppant subjected to an acoustic signal provided by a pulsed simple harmonic oscillator driving a transducer. A second transducer to receive the reflected pulse is placed alongside the first transducer. The proppant pack will have a characteristic acoustic impedance, $Z_{proppant}$ which will be necessarily different to the acoustic impedance of the surrounding formation, $Z_{formation}$. By virtue of the density and shear mass of the formation, $Z_{formation}$ would appear as an infinite impedance to the applied acoustic signal.

The incident acoustic wave will carry a given amount of energy that would be dependent upon the frequency and amplitude of the wave. Some of this incident energy will be absorbed by the packed proppant bed due to the impedance of the proppant bed. At the boundary of the proppant pack and formation, there will be two distinct events occurring, the first will be the formation of a transmitted wave, which will continue through the formation. The second event will be a reflected wave that will progress back through the proppant pack to the source. Due to the extremely high impedance of the formation, the energy of the reflected wave will be much higher than that of the transmitted wave. By measuring the time of flight of the acoustic pulse, and knowing the velocity of the acoustic wave in the proppant pack, the length of the fracture can be calculated.

Example 11

As in the case of Example 10, the pulsed simple harmonic oscillator is replaced by a variable frequency simple harmonic oscillator. This oscillator is used to drive the transducer to subject the proppant pack/fracture to the acoustic signal of varying frequency. The frequency of the oscillator is continuously swept from a low frequency of approximately 0.1 Hz to a high frequency of approximately 45 kHz, until a maximum intensity is detected by the receiver, thus implying that the proppant pack/formation is in resonance. The reflected waves at this frequency are detected by the receiver and the resulting complex waveform is reduced using a Fourier Transform to deconvolute the contributions due to the proppant particle reflections and the proppant pack/formation boundary reflections. Once the characteristic frequencies for the contributions are calculated, the corresponding wavelengths can be calculated and hence the length of the propped area determined. The frequency associated with the reflection from the proppant pack/formation boundary is the fundamental frequency from the Fourier Transformation, thus the length of the proppant pack is equal to ¼ of the wavelength at this frequency. Alternatively, the frequency can be set so that a minimum value occurs at the receiver, this also implies resonance within the proppant pack/fracture cavity has been achieved and in this case the length of the fracture will be equal to ½ of the calculated fundamental wavelength.

Example 12

In this example, a spherical particle containing unplasticized RDX explosive with a mean diameter of 300 microns is overcoated with a high strength, high elastic modulus brittle polymeric composite with a layer thickness of approximately 50 microns. The particles thus formed are blended with conventional proppant at a rate of 20 vol % explosive proppant to 80 vol % conventional proppant. The resulting proppant mixture is transported into the fracture zone of the subterranean formation after hydraulic fracturing. Upon the surface, around the wellbore is placed an array of geophones in a 3C seismic configuration. Upon removal of the hydraulic pressure, the fracture closes on the proppant pack. As the uniaxial pressure increases, the brittle polymer fails catastrophically and generates a shockwave that is sufficient to detonate the explosive charge contained within. The surface located geophones detect these explosive events and from a mathematical treatment of the data, the 3 dimensional (3D) location of each event may be calculated, thus giving a 3D image of the proppant pack.

Example 13

In a manner similar to example 12, the polymer coating thickness is reduced to approximately 20 microns. This polymeric layer is then overcoated with a solid acid such as crystalline zirconium sulphate. The solid acid is then overcoated with a thin polymer layer to protect the reactive component during handling and placement in the fracture. Upon closure of the fracture, the uniaxial force generated on each of the particles is large enough to cause catastrophic failure of the particle and the generation of a shock wave of sufficient intensity to detonate the explosive charge, thus dispersing the zirconium silicate through the carrier fluid to enhance degradation and viscosity reduction of the fluid.

Example 14

An array of tiltmeters are arranged on the surface around the wellbore. Upon the commencement of the hydraulic fracturing process, the tiltmeters detect the uplift of the earth. Upon placement of the proppant and reduction of fracturing pressure, the fracture closes and is supported by the proppant particles. In the areas where there is an absence of proppant, the uplift of the earth should return to approximately its original value. In the areas where the proppant is supporting the fracture walls, the uplift will be different to the original value of the surface tilt. Thus the propped area may be determined from the mapping of the surface tilt data to the location of each tiltmeter.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:
1. A proppant particle comprising:
a ceramic matrix; and
a functional component comprising a piezoelectric material, and further comprising one or more antenna-type device electrically coupled to the piezoelectric material, wherein upon irradiation of the proppant particle with an electromagnetic field, the one or more antenna-type device induces an electric current that generates a contraction or an expansion of the piezoelectric material.

2. A method for determining the geometry of a fracture in a geologic formation, the method comprising:
providing one or more devices to generate signals in the geologic formation, the signals comprising acoustic, seismic, vibrational, magnetic, electrical, electromagnetic, and/or heat signals;
providing one or more devices to detect the signals in the geologic formation;
injecting a proppant of claim 1 into the fracture, wherein the proppant comprises a signal-transforming attribute configured to transform signals generated by the one or more devices to generate signals;
generating signals in the geologic formation, using the one or more devices to generate signals;
transforming the signals generated, with the proppant pack, to form transformed signals; measuring the transformed signals; and
determining the geometry of the fracture using the measured transformed signals.

3. The method of claim 2, wherein the one or more devices to generate a signal comprises an ultra-sound generating device or an electrical signal generating device, and optionally the one or more devices to detect comprises an impedance measurement device, a piezoelectric detector, an optical detector that detects optical signals carried by fiber optics, or an array of accelerometers and the transformed signals comprise gravitational field strength signals.

4. The proppant particle of claim 1, wherein the functional component is distributed throughout the ceramic matrix.

5. The proppant particle of claim 1, wherein the functional component is incorporated in the proppant particle as a discrete phase.

6. The proppant particle of claim 1, wherein the functional component is incorporated in the proppant particle as a solid solution, an alloy, or any combination thereof, with the ceramic matrix or a polymer, in one or more layers and overcoated with a layer of the ceramic matrix or a polymer.

7. The proppant particle of claim 1, comprising a core of said functional component overcoated with the ceramic matrix or a polymer.

8. The proppant particle of claim 1, wherein the contraction or expansion of the piezoelectric material induces a vibration of the proppant particle.

9. The proppant particle of claim 1, wherein the piezoelectric material comprises a ceramic material having a perovskite-type crystal structure.

10. A method for determining the geometry of a fracture in a geologic formation, the method comprising:
positioning a detector in a position to measure vibrations from the geologic formation;
injecting the proppant of claim 1 into the fracture;
irradiating the geologic formation with alternating electromagnetic radiation sufficient to generate an electric current in the antenna-type device;
exciting the piezoelectric material with the electric current to induce the piezoelectric material to cause vibrations;
measuring the frequency of the vibrations; and
determining the geometry of the fracture from the measured vibrations.

11. A proppant particle comprising:
a ceramic matrix; and
a functional component comprising a cathodoluminescent material and further comprising an antenna-type device, wherein upon irradiation of the proppant particle with an electromagnetic field, the antenna-type device induces a flow of electrons that excite the cathodoluminescent material to induce photon emission.

12. A method for determining the geometry of a fracture in a geologic formation, the method comprising:
positioning a detector in a position to measure photons emitted from the geologic formation;
injecting the proppant of claim 11 into the fracture;
irradiating the proppant with an energy source sufficient to induce the cathodoluminescent material to emit photons;
measuring the photons emitted from the geologic formation; and
determining the geometry of the fracture from the measured photons.

13. The method of claim 12, wherein the detector comprises an array of photomultiplier tubes, an array of photodetectors, photographic film, a CCD device, or a combination thereof, and wherein the detector is sent down hole to measure the photons emitted from the geologic formation.

14. A proppant particle comprising:
a ceramic matrix; and
a functional component comprising carbon nanotubes and further comprising a silica core, wherein the silica core is coated with carbon nanotubes, and the carbon nanotubes are overcoated with the ceramic matrix or a polymer.

15. A method for heating a proppant pack in a fracture in a geologic formation, the method comprising:
providing a source of electromagnetic radiation;
injecting the proppant of claim 14 into the fracture; and
irradiating the proppant with electromagnetic radiation sufficient to induce the proppant to generate heat.

16. The method of claim 15, wherein the proppant further comprises a carrier fluid and the method comprises generating a sufficient amount of heat to degrade the carrier fluid.

17. The method of claim 15, wherein crude oil is present in the fracture, the irradiating comprises generating sufficient heat to reduce the viscosity of the crude oil, and the method further comprises recovering the crude oil.

18. A proppant particle comprising:
a ceramic matrix; and
a functional component comprising an iron oxide.

19. A method for determining the geometry of a fracture in a geologic formation, the method comprising:
positioning a detector in a position to measure a magnetic field generated from the geologic formation;
injecting the proppant of claim 18 into the fracture;
measuring the magnetic field generated from the geologic formation; and
determining the geometry of the fracture from the measured magnetic field.

20. The method of claim 19, wherein the detector comprises one or more superconducting quantum interference device.

21. A method for determining the geometry of a fracture in a geologic formation, the method comprising:
positioning one or more electrodes in a position to measure the electrical resistance of the geologic formation;
injecting the proppant of claim 18 into the fracture;
measuring the electrical resistance of the geologic formation; and
determining the geometry of the fracture from the measured electrical resistance.

22. A method for determining the geometry of a fracture in a geologic formation, the method comprising:

positioning a ground penetrating radar detector in a position to radiate electromagnetic signals into the geologic formation and to detect electromagnetic signals reflected from the geologic formation;

injecting the proppant of claim 18 into the fracture;

radiating electromagnetic signals into the geologic formation;

measuring electromagnetic signals that are reflected from the geologic formation; and determining the geometry of the fracture from the reflected electromagnetic signals.

23. A proppant particle comprising:
a ceramic matrix; and
a functional component, wherein said ceramic matrix is:
a glass-ceramic matrix; and
said functional component comprises magnetite.

24. The proppant particle of claim 23, wherein the functional component is incorporated in the proppant particle as a discrete phase in at least one layer overcoated with a layer of the glass-ceramic matrix.

* * * * *